United States Patent
Zhang

(10) Patent No.: US 12,149,383 B2
(45) Date of Patent: Nov. 19, 2024

(54) SRS SENDING METHOD, SRS RECEIVING METHOD, AND DEVICE

(71) Applicant: Huawei Technologies Co., Ltd., Shenzhen (CN)

(72) Inventor: Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 666 days.

(21) Appl. No.: 17/340,975

(22) Filed: Jun. 7, 2021

(65) Prior Publication Data
US 2021/0306184 A1 Sep. 30, 2021

Related U.S. Application Data

(63) Continuation of application No. PCT/CN2018/119891, filed on Dec. 7, 2018.

(51) Int. Cl.
*H04L 25/02* (2006.01)
*H04L 5/00* (2006.01)

(52) U.S. Cl.
CPC ........ *H04L 25/0226* (2013.01); *H04L 5/0012* (2013.01); *H04L 5/0051* (2013.01); *H04L 5/0092* (2013.01)

(58) Field of Classification Search
None
See application file for complete search history.

(56) References Cited

U.S. PATENT DOCUMENTS

| | | | | |
|---|---|---|---|---|
| 8,830,931 B2 * | 9/2014 | Chung | ................. | H04B 7/0684 370/252 |
| 10,110,362 B2 | 10/2018 | Dinan | | |
| 2011/0310931 A1 * | 12/2011 | Mehta | ................. | H04B 7/0691 375/135 |
| 2012/0263129 A1 * | 10/2012 | Noh | ...................... | H04W 72/23 370/329 |
| 2013/0208773 A1 * | 8/2013 | Noh | ...................... | H04L 5/0091 375/295 |

(Continued)

FOREIGN PATENT DOCUMENTS

| | | |
|---|---|---|
| CN | 101615928 A | 12/2009 |
| CN | 101931456 A | 12/2010 |

(Continued)

OTHER PUBLICATIONS

Samsung, "Remaining details on SRS", Nov. 27-Dec. 1, 2017, 3GPP TSG RAN WG1 Meeting 91, R1-1720313, pp. 1-9 (Year: 2017).*

(Continued)

*Primary Examiner* — Steve R Young

(74) *Attorney, Agent, or Firm* — Leydig, Voit & Mayer, Ltd.

(57) ABSTRACT

Embodiments of this application provide an SRS sending method, an SRS receiving method, and a device. A manner of determining an antenna used to send an SRS is provided. In addition, a case in which one subframe includes a plurality of symbols is considered by using a quantity of first time units that are used by a terminal device to send an SRS in one uplink subframe and a case in which one antenna is enabled to implement continuous sending as much as possible is also considered by using a quantity of first time units that are consecutively used to send the SRS in one subframe by using a same antenna.

17 Claims, 9 Drawing Sheets

(56) References Cited

U.S. PATENT DOCUMENTS

2016/0338050 A1* 11/2016 Kim .................. H04W 4/70
2021/0105156 A1*  4/2021 Chuang ............. H04L 5/0051

FOREIGN PATENT DOCUMENTS

| CN | 104335499   | A  | 2/2015  |
|----|-------------|----|---------|
| CN | 108111282   | A  | 6/2018  |
| EP |   3285533   | A1 | 2/2018  |
| KR | 20160087370 | A  | 7/2016  |
| WO |  2016179834 | A1 | 11/2016 |

OTHER PUBLICATIONS

Samsung, "Remaining details on SRS," 3GPP TSG RAN WG1 #91, Reno, USA, R1-172313, Total 9 pages, 3rd Generation Partnership Project, Valbonne, France (Nov. 27-Dec. 1, 2017).

Huawei et al., "On support of SRS antenna switching for 1T4R and 2T4R antenna configurations," 3GPP TSG RAN WG1 #92bis, R1-1803957, Total 7 pages, 3rd Generation Partnership Project, Valbonne, France (Apr. 16-20, 2018).

"On support of SRS antenna switching for 1T4R and 2T4R antenna configurations," 3GPP TSG RAN WG1 Meeting #92bis, Sanya, China, R1-1803957, Total 7 pages, 3rd Generation Partnership Project, Valbonne, France (Apr. 16-20, 2018).

* cited by examiner

SRS SENDING METHOD, SRS RECEIVING METHOD, AND DEVICE

CROSS-REFERENCE TO RELATED APPLICATIONS

This application is a continuation of International Application No. PCT/CN2018/119891, filed on Dec. 7, 2018, the disclosure of which is hereby incorporated by reference in its entirety.

TECHNICAL FIELD

This application relates to the field of communications technologies, and in particular, to an SRS sending method, an SRS receiving method, and a device.

BACKGROUND

In a time division duplex (TDD) system, an uplink channel and a downlink channel have reciprocity. A terminal device sends a sounding reference signal (SRS) in uplink. A network device may estimate an uplink channel by using the SRS, and may obtain a downlink beamforming weight value based on the uplink channel.

In an existing long term evolution (LTE) standard, the SRS may be sent on the last symbol of an uplink subframe. As shown in FIG. 1, the SRS is sent on a symbol shown in a part marked with slashes in FIG. 1.

In an LTE release 16, it has been determined that more symbols may be used to transmit the SRS in one uplink subframe. In this case, how to determine an antenna for sending an SRS is a problem that needs to be resolved.

SUMMARY

This application provides an SRS sending method, an SRS receiving method, and a device, to provide a manner of determining an antenna for sending an SRS.

According to a first aspect, a first SRS sending method is provided. A terminal device may determine, based on a quantity $M_{SRS}$ of first time units that are used by the terminal device to send an SRS in one uplink subframe, a first index $n'_{SRS}$ of a first time unit used to send the SRS, and then determine, based on $n'_{SRS}$ and a quantity $M_a$ of first time units that are consecutively used to send the SRS in one subframe by using a same antenna, an antenna that is used to send the SRS in a first time unit and that corresponds to $n'_{SRS}$. Therefore, a case in which one subframe includes a plurality of first time units is considered by using $M_{SRS}$ and a case in which one antenna is enabled to implement continuous sending as much as possible is also considered by using $M_a$. It may be learned that in the technical solution provided in this embodiment of this application, a manner of determining an antenna for sending an SRS is provided, and a same antenna can be enabled to implement continuous sending in one subframe as much as possible, thereby minimizing an antenna switching process.

The method may be performed by the terminal device. The terminal device may be an independent device or a communications apparatus that can support a device in implementing a function required by the method, for example, a chip system.

With reference to the first aspect, in a possible implementation of the first aspect, the terminal device may determine $n'_{SRS}$ based on $M_{SRS}$. For example, the terminal device may determine $n'_{SRS}$ based on elements such as $M_{SRS}$, an SRS transmission periodicity configured by a network device for the terminal device, a position of a subframe that is used to send the SRS in the periodicity $T_{SRS}$ configured by the network device for the terminal device, a quantity of downlink-to-uplink switching points in a radio frame in which the SRS is located, a frame number of the radio frame in which the SRS is located, a slot number in the radio frame in which the SRS is located, and an index of a first time unit that is allocated to the terminal device to transmit the SRS in one subframe.

In this way, a case in which one subframe includes a plurality of first time units is considered during the determining of $n'_{SRS}$. Certainly, a manner of determining $n'_{SRS}$ based on $M_{SRS}$ is not limited thereto.

With reference to the first aspect, in a possible implementation of the first aspect, the terminal device determines, based on a quantity of transmit antennas and a quantity of receive antennas that are corresponding to the terminal device, $n'_{SRS}$, and $M_a$ if no frequency hopping is configured for the SRS, an index of the antenna that is used to send the SRS in the first time unit and that corresponds to $n'_{SRS}$; or the terminal device determines, based on a quantity of subbands occupied by the SRS in a frequency hopping process, $n'_{SRS}$, and $M_a$ if frequency hopping is configured for the SRS, an index of the antenna that is used to send the SRS in the first time unit and that corresponds to $n'_{SRS}$; or the terminal device determines, based on a quantity of transmit antennas and a quantity of receive antennas that are corresponding to the terminal device, $n'_{SRS}$, and $M_a$, an index of the antenna that is used to send the SRS in the first time unit and that corresponds to $n'_{SRS}$.

When frequency hopping or no frequency hopping is configured for the SRS, because frequency hopping involves a quantity of subbands for the frequency hopping, a manner of determining, by the terminal device, the index of the antenna used to send the SRS in the first time unit may vary, so that the index that is of the antenna used to send the SRS in the first time unit and that is determined by the terminal device is more accurate. Alternatively, regardless of whether frequency hopping or no frequency hopping is configured for the SRS, the terminal device may determine, in a same manner, the index of the antenna used to send the SRS in the first time unit. This manner is relatively simple.

With reference to the first aspect, in a possible implementation of the first aspect, when the terminal device has two antennas and sends the SRS by using one of the antennas at a same moment, or in other words, when the terminal device is 1T2R, the terminal device may determine, based on the quantity of transmit antennas and the quantity of receive antennas that are corresponding to the terminal device, $n'_{SRS}$, and $M_a$ if no frequency hopping is configured for the SRS, the index of the antenna used to send the SRS in the first time unit, and the terminal device may determine, based on the quantity of subbands occupied by the SRS in the frequency hopping process, $n'_{SRS}$, $M_a$, and $\beta$ if frequency hopping is configured for the SRS, the index of the antenna used to send the SRS in the first time unit. Certainly, this is merely an example. When the terminal device is 1T2R, the manner of determining, by the terminal device, the index of the antenna used to send the SRS in the first time unit is not limited thereto.

With reference to the first aspect, in a possible implementation of the first aspect, when the terminal device has four antennas and sends the SRS by using one of the antennas at a same moment, or in other words, when the terminal device is 1T4R, the terminal device may determine, based on the quantity of transmit antennas and the quantity of receive antennas that are corresponding to the terminal device, $n'_{SRS}$, and $M_a$ if no frequency hopping is configured for the SRS, the index of the antenna used to send the SRS in the first time unit, and the terminal device may determine, based on the quantity of subbands occupied by the SRS in the frequency hopping process, $n'_{SRS}$, $M_a$, and β if frequency hopping is configured for the SRS, the index of the antenna used to send the SRS in the first time unit. Certainly, this is merely an example. When the terminal device is 1T4R, the manner of determining, by the terminal device, the index of the antenna used to send the SRS in the first time unit is not limited thereto.

With reference to the first aspect, in a possible implementation of the first aspect, when the terminal device has four antennas and sends the SRS by using two of the antennas at a same moment, or in other words, when the terminal device is 2T4R, the terminal device may determine, based on the quantity of transmit antennas and the quantity of receive antennas that are corresponding to the terminal device, $n'_{SRS}$, and $M_a$ if no frequency hopping is configured for the SRS, the index of the antenna used to send the SRS in the first time unit, and the terminal device may determine, based on the quantity of subbands occupied by the SRS in the frequency hopping process, the quantity of transmit antennas and the quantity of receive antennas that are corresponding to the terminal device, $n'_{SRS}$, $M_a$, and β if frequency hopping is configured for the SRS, the index of the antenna used to send the SRS in the first time unit. Certainly, this is merely an example. When the terminal device is 2T4R, the manner of determining, by the terminal device, the index of the antenna used to send the SRS in the first time unit is not limited thereto.

With reference to the first aspect, in a possible implementation of the first aspect, regardless of whether frequency hopping is configured for the SRS and regardless of whether the terminal device is 1T2R, 1T4R, or 2T4R, the terminal device may determine, based on the quantity of transmit antennas and the quantity of receive antennas that are corresponding to the terminal device, $n'_{SRS}$, and $M_a$, the index of the antenna used to send the SRS in the first time unit. This manner is relatively simple.

With reference to the first aspect, in a possible implementation of the first aspect, the terminal device may further determine, based on $n'_{SRS}$, a subband used to send the SRS, to complete frequency hopping. The subband is determined based on $n'_{SRS}$, so that a case in which the terminal device sends the SRS in one subframe by using a plurality of first time units is considered.

With reference to the first aspect, in a possible implementation of the first aspect, the terminal device may determine, based on $n'_{SRS}$, a quantity of antennas in the terminal device, SRS-hopping bandwidth delivered by the network device, a periodic SRS frequency domain position or aperiodic SRS frequency domain position delivered by the network device, and an SRS-bandwidth configuration delivered by the network device, the subband used to send the SRS. Certainly, a manner of determining, by the terminal device based on $n'_{SRS}$, the subband used to send the SRS is not limited thereto.

According to a second aspect, a second SRS sending method is provided. In this method, a terminal device traverses all of P subbands when sending an SRS in P first time units, and the terminal device traverses all transmit antennas of the terminal device when sending the SRS in the P first time units. In this way, a network device can obtain channel information of all uplink subbands in a relatively short time, so that the network device can perform relatively proper scheduling on the terminal device. In addition, in this embodiment of this application, when an antenna used to send the SRS is being determined, a case in which one subframe includes a plurality of first time units is considered and a case in which one antenna is enabled to implement continuous sending as much as possible is also considered by using $M_a$, so that a quantity of antenna switching times can be reduced in one subframe, or no antenna switching may be performed in one subframe, to ensure service continuity as much as possible and reduce power consumption caused by antenna switching of the terminal device.

The method may be performed by the terminal device. The terminal device may be an independent device or a communications apparatus that can support a device in implementing a function required by the method, for example, a chip system.

With reference to the second aspect, in a possible implementation of the second aspect, the terminal device may determine $n'_{SRS}$ based on $M_{SRS}$. For example, the terminal device may determine $n'_{SRS}$ based on elements such as $M_{SRS}$, an SRS transmission periodicity configured by the network device for the terminal device, a position of a subframe that is used to send the SRS in the periodicity $T_{SRS}$ configured by the network device for the terminal device, a quantity of downlink-to-uplink switching points in a radio frame in which the SRS is located, a frame number of the radio frame in which the SRS is located, a slot number in the radio frame in which the SRS is located, and an index of a first time unit that is allocated to the terminal device to transmit the SRS in one subframe.

In this way, a case in which one subframe includes a plurality of first time units is considered during the determining of $n'_{SRS}$. Certainly, a manner of determining $n'_{SRS}$ based on $M_{SRS}$ is not limited thereto.

With reference to the first aspect or the second aspect, in a possible implementation, the first time unit is one symbol or H consecutive symbols, and H is an integer greater than or equal to 2. In other words, the first time unit may be one symbol or a plurality of consecutive symbols. An implementation of the first time unit is not limited in this embodiment of this application.

According to a third aspect, a first SRS receiving method is provided. A network device may determine, based on a quantity $M_{SRS}$ of first time units that are used by a terminal device to send an SRS in one uplink subframe, a first index $n'_{SRS}$; of a first time unit used to send the SRS, and then may determine, based on $n'_{SRS}$ and a quantity $M_a$ of first time units that are consecutively used to send the SRS in one subframe by using a same antenna, an antenna that is used to send the SRS in a first time unit and that corresponds to $n'_{SRS}$. Therefore, a case in which one subframe includes a plurality of first time units is considered by using $M_{SRS}$ and a case in which one antenna is enabled to implement continuous sending as much as possible is also considered by using $M_a$. It may be learned that in the technical solution provided in this embodiment of this application, a manner of determining an antenna for sending an SRS is provided, and a same antenna can be enabled to implement continuous sending in one subframe as much as possible, thereby minimizing an antenna switching process.

The method may be performed by the network device. The network device may be an independent device or a communications apparatus that can support a device in implementing a function required by the method, for example, a chip system.

With reference to the third aspect, in a possible implementation of the third aspect, the network device may determine $n'_{SRS}$ based on $M_{SRS}$. For example, the terminal device may determine $n'_{SRS}$ based on elements such as $M_{SRS}$, an SRS transmission periodicity configured by the network device for the terminal device, a position of a subframe that is used to send the SRS in the periodicity $T_{SRS}$ configured by the network device for the terminal device, a quantity of downlink-to-uplink switching points in a radio frame in which the SRS is located, a frame number of the radio frame in which the SRS is located, a slot number in the radio frame in which the SRS is located, and an index of a first time unit that is allocated to the terminal device to transmit the SRS in one subframe.

In this way, a case in which one subframe includes a plurality of first time units is considered during the determining of $n'_{SRS}$. Certainly, a manner of determining $n'_{SRS}$ based on $M_{SRS}$ is not limited thereto.

With reference to the third aspect, in a possible implementation of the third aspect, the network device determines, based on a quantity of transmit antennas and a quantity of receive antennas that are corresponding to the terminal device, $n'_{SRS}$, and $M_a$ if no frequency hopping is configured for the SRS, an index of the antenna that is used to send the SRS in the first time unit and that corresponds to $n'_{SRS}$; or the network device determines, based on a quantity of subbands occupied by the SRS in a frequency hopping process, $n'_{SRS}$, and $M_a$ if frequency hopping is configured for the SRS, an index of the antenna that is used to send the SRS in the first time unit and that corresponds to $n'_{SRS}$; or the network device determines, based on a quantity of transmit antennas and a quantity of receive antennas that are corresponding to the terminal device, $n'_{SRS}$, and $M_a$, an index of the antenna that is used to send the SRS in the first time unit and that corresponds to $n'_{SRS}$.

When frequency hopping or no frequency hopping is configured for the SRS, because frequency hopping involves a quantity of subbands for the frequency hopping, a manner of determining, by the network device, the index of the antenna used to send the SRS in the first time unit may vary, so that the index that is of the antenna used to send the SRS in the first time unit and that is determined by the network device is more accurate. Alternatively, regardless of whether frequency hopping or no frequency hopping is configured for the SRS, the network device may determine, in a same manner, the index of the antenna used to send the SRS in the first time unit. This manner is relatively simple.

With reference to the third aspect, in a possible implementation of the third aspect, when the terminal device has two antennas and sends the SRS by using one of the antennas at a same moment, or in other words, when the terminal device is 1T2R, the network device may determine, based on the quantity of transmit antennas and the quantity of receive antennas that are corresponding to the terminal device, $n'_{SRS}$, and $M_a$ if no frequency hopping is configured for the SRS, the index of the antennas used to send the SRS in the first time unit, and the network device may determine, based on the quantity of subbands occupied by the SRS in the frequency hopping process, $n'_{SRS}$, $M_a$, and β if frequency hopping is configured for the SRS, the index of the antenna used to send the SRS in the first time unit. Certainly, this is merely an example. When the terminal device is 1T2R, the manner of determining, by the network device, the index of the antenna used to send the SRS in the first time unit is not limited thereto.

With reference to the third aspect, in a possible implementation of the third aspect, when the terminal device has four antennas and sends the SRS by using one of the antennas at a same moment, or in other words, when the terminal device is 1T4R, the network device may determine, based on the quantity of transmit antennas and the quantity of receive antennas that are corresponding to the terminal device, $n'_{SRS}$, and $M_a$ if no frequency hopping is configured for the SRS, the index of the antennas used to send the SRS in the first time unit, and the network device may determine, based on the quantity of subbands occupied by the SRS in the frequency hopping process, $n'_{SRS}$, $M_a$, and β if frequency hopping is configured for the SRS, the index of the antenna used to send the SRS in the first time unit. Certainly, this is merely an example. When the terminal device is 1T4R, the manner of determining, by the network device, the index of the antenna used to send the SRS in the first time unit is not limited thereto.

With reference to the third aspect, in a possible implementation of the third aspect, when the terminal device has four antennas and sends the SRS by using two of the antennas at a same moment, or in other words, when the terminal device is 2T4R, the network device may determine, based on the quantity of transmit antennas and the quantity of receive antennas that are corresponding to the terminal device, $n'_{SRS}$, and $M_a$ if no frequency hopping is configured for the SRS, the index of the antennas used to send the SRS in the first time unit, and the network device may determine, based on the quantity of subbands occupied by the SRS in the frequency hopping process, the quantity of transmit antennas and the quantity of receive antennas that are corresponding to the terminal device, $n'_{SRS}$, $M_a$, and β if frequency hopping is configured for the SRS, the index of the antenna used to send the SRS in the first time unit. Certainly, this is merely an example. When the terminal device is 2T4R, the manner of determining, by the network device, the index of the antenna used to send the SRS in the first time unit is not limited thereto.

With reference to the third aspect, in a possible implementation of the third aspect, regardless of whether frequency hopping is configured for the SRS and regardless of whether the terminal device is 1T2R, 1T4R, or 2T4R, the network device may determine, based on the quantity of transmit antennas and the quantity of receive antennas that are corresponding to the terminal device, $n'_{SRS}$, and $M_a$, the index of the antenna used to send the SRS in the first time unit. This manner is relatively simple.

With reference to the third aspect, in a possible implementation of the third aspect, the network device may further determine, based on $n'_{SRS}$, a subband used to send the SRS, to complete frequency hopping. The subband is determined based on $n'_{SRS}$, so that a case in which the terminal device sends the SRS in one subframe by using a plurality of first time units is considered.

With reference to the third aspect, in a possible implementation of the third aspect, the network device may determine, based on $n'_{SRS}$, a quantity of antennas in the terminal device, SRS-hopping bandwidth delivered by the network device, a periodic SRS frequency domain position or aperiodic SRS frequency domain position delivered by the network device, and an SRS-bandwidth configuration delivered by the network device, the subband used to send the SRS. Certainly, a manner of determining, by the network device based on $n'_{SRS}$, the subband used to send the SRS is not limited thereto.

According to a fourth aspect, a second SRS receiving method is provided. In this method, a network device traverses all of P subbands when receiving an SRS in P first time units, and the network device traverses all transmit antennas of a terminal device when receiving the SRS in the P first time units. In this way, the network device can obtain channel information of all uplink subbands in a relatively short time, so that the network device can perform relatively proper scheduling on the terminal device. In addition, in this embodiment of this application, when an antenna used to send the SRS is being determined, a case in which one subframe includes a plurality of first time units is considered and a case in which one antenna is enabled to implement continuous sending as much as possible is also considered by using $M_a$, so that a quantity of antenna switching times can be reduced in one subframe, or no antenna switching may be performed in one subframe, to ensure service continuity as much as possible and reduce power consumption caused by antenna switching of the terminal device.

The method may be performed by the network device. The network device may be an independent device or a communications apparatus that can support a device in implementing a function required by the method, for example, a chip system.

With reference to the fourth aspect, in a possible implementation of the fourth aspect, the network device may determine $n'_{SRS}$ based on $M_{SRS}$. For example, the network device may determine $n'_{SRS}$ based on elements such as $M_{SRS}$, an SRS transmission periodicity configured by the network device for the terminal device, a position of a subframe that is used to send the SRS in the periodicity $T_{SRS}$ configured by the network device for the terminal device, a quantity of downlink-to-uplink switching points in a radio frame in which the SRS is located, a frame number of the radio frame in which the SRS is located, a slot number in the radio frame in which the SRS is located, and an index of a first time unit that is allocated to the terminal device to transmit the SRS in one subframe.

In this way, a case in which one subframe includes a plurality of first time units is considered during the determining of $n'_{SRS}$. Certainly, a manner of determining $n'_{SRS}$ based on $M_{SRS}$ is not limited thereto.

With reference to the third aspect or the fourth aspect, in a possible implementation, the first time unit is one symbol or H consecutive symbols, and H is an integer greater than or equal to 2. In other words, the first time unit may be one symbol or a plurality of consecutive symbols. An implementation of the first time unit is not limited in this embodiment of this application.

According to a fifth aspect, a first terminal device is provided. The terminal device includes a processor, configured to implement the method described in any one of the first aspect and the possible implementations of the first aspect. The terminal device may further include a memory, configured to store program instructions and data. The memory is coupled to the processor, and the processor may invoke and execute the program instructions stored in the memory, to implement the method described in any one of the first aspect and the possible implementations of the first aspect. The terminal device may further include a communications interface, and the communications interface is used by the terminal device to communicate with another device. For example, if the terminal device is an independent device, the communications interface is, for example, a transceiver. For example, the another device is a network device. For example, the transceiver is configured to receive configuration information from the network device, where the configuration information is used to indicate a quantity $M_{SRS}$ of first time units that are used by the terminal device to send an SRS in one subframe, and the subframe includes a plurality of first time units.

The processor is configured to determine, based on $M_{SRS}$, a first index $n'_{SRS}$ of a first time unit used to send the SRS.

The processor is further configured to determine, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The transceiver is further configured to send, by using the antenna, the SRS in the first time unit indicated by $n'_{SRS}$.

With reference to the fifth aspect, in a possible implementation of the fifth aspect, the processor is configured to determine, in the following manner based on $M_{SRS}$, the first index $n'_{SRS}$ of the first time unit used to send the SRS:

$n'_{SRS}$ satisfies the following formula:

$$n'_{SRS} = \begin{cases} \left(2N_{SP}n_f + 2(N_{SP}-1)\lfloor \frac{n_s}{10} \rfloor + \lfloor \frac{T_{offset}}{T_{offset,max}} \rfloor\right) \times M_{SRS} + m, \text{ frame structure type 2 with an SRS periodicity of 2 ms} \\ \lfloor n_f \times 10 + \lfloor \frac{n_s}{10} \rfloor / T_{SRS} \rfloor \times M_{SRS} + m, \text{ other cases} \end{cases}$$

where
$T_{SRS}$ represents an SRS transmission periodicity configured by the network device for the terminal device, $T_{offset}$ represents a position of a subframe that is used to send the SRS in the periodicity $T_{SRS}$ configured by the network device for the terminal device, $N_{SP}$ represents a quantity of downlink-to-uplink switching points in a radio frame in which the SRS is located, $n_f$ represents a frame number of the radio frame in which the SRS is located, $n_s$ represents a slot number in the radio frame in which the SRS is located, $n_s = 0, 1, \ldots, 19$, m represents an index of a first time unit that is allocated to the terminal device to transmit the SRS in one subframe, and $m = 0, 1, \ldots, M_{SRS}-1$.

With reference to the fifth aspect, in a possible implementation of the fifth aspect, the processor is further configured to:

determine, based on a quantity of transmit antennas and a quantity of receive antennas that are corresponding to the terminal device, $n'_{SRS}$, and $M_a$ if no frequency hopping is configured for the SRS, an index of the antenna that is used to send the SRS in the first time unit and that corresponds to $n'_{SRS}$; or determine, based on a quantity of subbands occupied by the SRS in a frequency hopping process, $n'_{SRS}$, and $M_a$ if frequency hopping is configured for the SRS, an index of the antenna that is used to send the SRS in the first time unit and that corresponds to $n'_{SRS}$; or determine, based on a quantity of transmit antennas and a quantity of receive antennas that are corresponding to the terminal device, $n'_{SRS}$, and $M_a$, an index of the antenna that is used to send the SRS in the first time unit and that corresponds to $n'_{SRS}$.

With reference to the fifth aspect, in a possible implementation of the fifth aspect, when the terminal device has two antennas and sends the SRS by using one of the antennas at a same moment, the processor is configured to determine, in the following manner based on $n'_{SRS}$ and $M_a$, the antenna that is used to send the SRS in the first time unit and that corresponds to $n'_{SRS}$:

the processor is configured to determine, in the following manner based on the quantity of transmit antennas and the quantity of receive antennas that are corresponding to the terminal device, $n'_{SRS}$, and $M_a$ if no frequency hopping is configured for the SRS, the index of the antenna that is used to send the SRS in the first time unit and that corresponds to $n'_{SRS}$, where the index of the antenna that is used to send the SRS in the first time unit and that corresponds to nass satisfies the following formula: $a(n_{SRS\_ant}) = n_{SRS\_ant} \mod 2$, where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, and mod represents a modulo operation; or the processor is configured to determine, in the following manner based on the quantity of subbands occupied by the SRS in the frequency hopping process, $n'_{SRS}$, and $M_a$ if frequency hopping is configured for the SRS, the index of the antenna that is used to send the SRS in the first time unit and that corresponds to $n'_{SRS}$, where
the index of the antenna that is used to send the SRS in the first time unit and that corresponds to $n'_{SRS}$ satisfies the following formula:

$$a(n_{SRS\_ant}) = \begin{cases} \left(n_{SRS\_ant} + \lfloor n_{SRS\_ant}/2 \rfloor + \beta \cdot \left\lfloor \frac{M_R \times n_{SRS,ant}}{K} \right\rfloor \right) \bmod 2, & \text{when } \frac{K}{M_a} \text{ is an even integer} \\ n_{SRS\_ant} \bmod 2, & \text{other cases} \end{cases}$$

where
$a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, mod represents a modulo operation, K represents the quantity of subbands occupied by the SRS in the frequency hopping process, and $$\beta = \begin{cases} 1, & \text{when } \frac{K}{M_a} \bmod 4 = 0 \\ 0, & \text{other cases} \end{cases}.$$

With reference to the fifth aspect, in a possible implementation of the fifth aspect, when the terminal device has four antennas and sends the SRS by using one of the antennas at a same moment, the processor is configured to determine, in the following manner based on $n'_{SRS}$ and $M_a$, the antenna that is used to send the SRS in the first time unit and that corresponds to $n'_{SRS}$:
the processor is configured to determine, in the following manner based on the quantity of transmit antennas and the quantity of receive antennas that are corresponding to the terminal device, $n'_{SRS}$, and $M_a$, if no frequency hopping is configured for the SRS, the index of the antenna that is used to send the SRS in the first time unit and that corresponds to $n'_{SRS}$ where
the index of the antenna that is used to send the SRS in the first time unit and that corresponds to $n'_{SRS}$ satisfies the following formula: $a(n_{SRS\_ant}) = n'_{SRS\_ant} \bmod 4$, where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, and mod represents a modulo operation; or
the processor is configured to determine, in the following manner based on the quantity of subbands occupied by the SRS in the frequency hopping process, $n'_{SRS}$, and $M_a$ if frequency hopping is configured for the SRS, the index of the antenna that is used to send the SRS in the first time unit and that corresponds to $n'_{SRS}$, where
the index of the antenna that is used to send the SRS in the first time unit and that corresponds to $n'_{SRS}$ uses satisfies the following formula:

$$a(n_{SRS\_ant}) = \begin{cases} \left(n_{SRS\_ant} + \lfloor n_{SRS\_ant}/2 \rfloor + \beta \cdot \left\lfloor \frac{M_a \times n_{SRS,ant}}{K} \right\rfloor \right) \bmod 2, & \text{when } \frac{K}{M_a} \text{ is an even integer} \\ n_{SRS\_ant} \bmod 2, & \text{other cases} \end{cases}$$

where
$a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, K represents the quantity of subbands occupied by the SRS in the frequency hopping process, mod represents a modulo operation, and $$\beta = \begin{cases} 1, & \text{if } N_1 = 2, N_2 = 2 \\ 0, & \text{other cases} \end{cases}.$$

With reference to the fifth aspect, in a possible implementation of the fifth aspect, when the terminal device has four antennas and sends the SRS by using two of the antennas at a same moment, the processor is configured to determine, in the following manner based on $n'_{SRS}$ and $M_a$, the antenna that is used to send the SRS in the first time unit and that corresponds to $n'_{SRS}$:
the processor is configured to determine, in the following manner based on the quantity of transmit antennas and the quantity of receive antennas that are corresponding to the terminal device, $n'_{SRS}$, and $M_a$ if no frequency hopping is configured for the SRS, the index of the antenna that is used to send the SRS in the first time unit and that corresponds to $n'_{SRS}$, where
the index of the antenna that is used to send the SRS in the first time unit and that corresponds to $n'_{SRS}$ satisfies the following formula: $a(n_{SRS\_ant}) = n_{SRS\_ant} \bmod \Lambda$, where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, mod represents a modulo operation, and $\Lambda$ is 2 or 3; or
the processor is configured to determine, in the following manner based on the quantity of subbands occupied by the SRS in the frequency hopping process, $n'_{SRS}$, and $M_a$ if frequency hopping is configured for the SRS, the index of the antenna that is used to send the SRS in the first time unit and that corresponds to $n'_{SRS}$, where
the index of the antenna that is used to send the SRS in the first time unit and that corresponds to news satisfies the following formula:

$$a(n_{SRS\_ant}) = \left\{ \begin{array}{l} n_{SRS\_ant} + \left\lfloor \frac{n_{SRS\_ant}}{\Lambda} \right\rfloor + \beta \left( \left\lfloor \frac{M_a \times n_{SRS\_ant}}{K} \right\rfloor \right) \text{mod } \Lambda, \text{ where } \frac{K}{M_a} \text{ is an integer and } \frac{K}{M_a} \text{ mod } \Lambda = 0 \\ n_{SRS\_ant} \text{ mod } \Lambda, \text{ other cases} \end{array} \right\},$$

where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, K represents the quantity of subbands occupied by the SRS in the frequency hopping process, mod represents a modulo operation, and $$\beta = \begin{cases} 1, & \text{if } \frac{K}{M_a} \text{ mod } \Lambda^2 = 0 \\ 0, & \text{other cases} \end{cases}.$$

With reference to the fifth aspect, in a possible implementation of the fifth aspect, the processor is configured to determine, in the following manner based on the quantity of transmit antennas and the quantity of receive antennas that are corresponding to the terminal device, $n'_{SRS}$, and $M_a$, the index of the antenna that is used to send the SRS in the first time unit and that corresponds to $n'_{SRS}$:

when the terminal device has two antennas and sends the SRS by using one of the antennas at a same moment, the index of the antenna that is used to send the SRS in the first time unit and that corresponds to uses satisfies the following formula: $a(n_{SRS\_ant}) = n_{SRS\_ant}$ mod 2, where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, and mod represents a modulo operation; or when the terminal device has four antennas and sends the SRS by using one of the antennas at a same moment, the index of the antenna that is used to send the SRS in the first time unit and that corresponds to $n'_{SRS}$ satisfies the following formula: $a(n_{SRS\_ant}) = n_{SRS\_ant}$ mod 4, where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, and mod represents a modulo operation; or when the terminal device has four antennas and sends the SRS by using two of the antennas at a same moment, the index of the antenna that is used to send the SRS in the first time unit and that corresponds to $n'_{SRS}$ satisfies the following formula: $a(n_{SRS\_ant}) = n_{SRS\_out}$ mod $\Lambda$, where $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, mod represents a modulo operation, and $\Lambda$ is 2 or 3.

With reference to the fifth aspect, in a possible implementation of the fifth aspect, the processor is further configured to:

determine, based on $n'_{SRS}$, a subband used to send the SRS.

With reference to the fifth aspect, in a possible implementation of the fifth aspect, the processor is configured to determine, in the following manner based on $n'_{SRS}$, the subband used to send the SRS:

an index of the subband used to send the SRS satisfies the following formula:

$$n_b = \left\{ \begin{array}{l} \lfloor 4n_{RRC}/m_{SRS,b} \rfloor \text{mod } N_b, \text{ when } b \leq b_{hop} \\ \left( F_b(n_{SRS\_fh}) + \left\lfloor \frac{4n_{RRC}}{m_{SRS,b}} \right\rfloor \right) \text{mod } N_b, \text{ other cases} \end{array} \right\},$$

where $$n_{SRS\_fh} = \left\lfloor \frac{n_{SRS'}}{M_a N_{ant}} \right\rfloor \times M_a + n'_{SRS} \text{mod } M_a, N_{ant}$$

represents a quantity of antennas in the terminal device, and $$\left\{ \begin{array}{l} \left( \frac{N_b}{2} \right) \left\lfloor \frac{n_{SRS,fh} \text{mod} \prod_{b'=b_{hop}}^{b} N'_b}{\prod_{b'=b_{hop}}^{b-1} N'_b} \right\rfloor + \left\lfloor \frac{n_{SRS,fh} \text{mod} \prod_{b'=b_{hop}}^{b} N'_b}{2\prod_{b'=b_{hop}}^{b-1} N'_b} \right\rfloor, \text{ where } N_b \text{ is an even number} \\ \lfloor N_b/2 \rfloor \left\lfloor n_{SRS,fh} / \prod_{b'=b_{hop}}^{b-1} N'_b \right\rfloor, \text{ when } N_b \text{ is an odd number} \end{array} \right.,$$

where $b_{hop}$ is determined based on SRS-hopping bandwidth delivered by the network device, $h_{hop} \in \{0, 1, 2, 3\}$, $n_{RRC}$ is determined based on a periodic SRS frequency domain position or an aperiodic SRS frequency domain position delivered by the network device, and $B_{SRS}$, $N_b$, $N_{b'}$, and $M_{SRS,b}$ are determined based on an SRS-bandwidth configuration delivered by the network device.

For technical effects of any one of the fifth aspect and the possible implementations of the fifth aspect, refer to the descriptions of the technical effects of the first aspect or the possible implementations of the first aspect.

According to a sixth aspect, a second terminal device is provided. The terminal device includes a processor, configured to implement the method described in any one of the second aspect and the possible implementations of the second aspect. The terminal device may further include a memory, configured to store program instructions and data. The memory is coupled to the processor, and the processor may invoke and execute the program instructions stored in the memory, to implement the method described in any one of the second aspect and the possible implementations of the second aspect. The terminal device may further include a communications interface, and the communications interface is used by the terminal device to communicate with another device. For example, if the terminal device is an independent device, the communications interface is, for example, a transceiver. For example, the another device is a network device. For example, the transceiver is configured to receive configuration information from the network device, where the configuration information is used to indicate the terminal device to perform frequency hopping within P subbands, and P is a positive integer.

The transceiver is further configured to send an SRS to the network device in a frequency hopping manner within the P subbands, where the terminal device traverses all of the P subbands when sending the SRS in P first time units, and the terminal device traverses all transmit antennas of the terminal device when sending the SRS in the P first time units; and the processor included in the terminal device determines, based on the following formula, an index of an antenna used to send the SRS in the P first time units, where when the terminal device has two antennas and sends the SRS by using one of the antennas at a same moment, the index of the antenna used to send the SRS in the P first time units satisfies the following formula: $a(n_{SRS\_ant}) = n_{SRS\_ant}$ mod 2, where $a(n_{SRS\_ant})$ represents the index of the antenna used to send the SRS, $n_{SRS\_ant} = \lfloor n'_{SRS}/M_a \rfloor$, and mod represents a modulo operation; or when the terminal device has four antennas and sends the SRS by using one of the antennas at a same moment, the index of the antenna used to send the SRS in the P first time units satisfies the following formula: $a(n_{SRS\_ant}) = n_{SRS\_ant}$ mod 4, where $a(n_{SRS\_ant})$ represents the index of the antenna used to send the SRS, $n_{SRS\_ant} = \lfloor n'_{SRS}/M_a \rfloor$, and mod represents a modulo operation; or when the terminal device has four antennas and sends the SRS by using two of the antennas at a same moment, the index of the antenna used to send the SRS in the P first time units satisfies the following formula: $a(n_{SRS\_ant}) = n_{SRS\_ant}$ mod $\Lambda$, where $a(n_{SRS\_ant})$ represents the index of the antenna used to send the SRS, $n_{SRS\_ant} = \lfloor n'_{SRS}/M_a \rfloor$, mod represents a modulo operation, and $\Lambda$ is 2 or 3, where $M_a$ is a quantity of first time units that are consecutively used to send the SRS in one subframe by using a same antenna, and $n'_{SRS}$ is a first index of a first time unit used to send the SRS.

With reference to the sixth aspect, in a possible implementation of the sixth aspect, $n'_{SRS}$ satisfies the following formula:

$$n'_{SRS} = \begin{cases} \left(2N_{SP}n_f + 2(N_{SP}-1)\lfloor \frac{n_s}{10} \rfloor + \lfloor \frac{T_{offset}}{T_{offset\_max}} \rfloor\right) \times M_{SRS} + m, \\ \text{frame structure type 2 with an SRS periodicity of 2 ms} \\ \lfloor n_f \times 10 + \lfloor \frac{n_s}{2} \rfloor \rfloor / T_{SRS} \rfloor \times M_{SRS} + m, \text{other cases} \end{cases}$$

where $T_{SRS}$ represents an SRS transmission periodicity configured by the network device for the terminal device, $T_{offset}$ represents a position of a subframe that is used to send the SRS in the periodicity $T_{SRS}$ configured by the network device for the terminal device, $N_{SP}$ represents a quantity of downlink-to-uplink switching points in a radio frame in which the SRS is located, $n_f$ represents a frame number of the radio frame in which the SRS is located, $n_s$ represents a slot number in the radio frame in which the SRS is located, $n_s=0, 1, \ldots, 19$, $M_{SRS}$ represents a quantity of first time units that are allocated to the terminal device to transmit the SRS in one subframe, m represents an index of a first time unit that is allocated to the terminal device to transmit the SRS in one subframe, and $m=0, 1, \ldots, M_{SRS}-1$.

With reference to the sixth aspect, in a possible implementation of the sixth aspect, the first time unit is one symbol or H consecutive symbols, and H is an integer greater than or equal to 2.

For technical effects of any one of the sixth aspect and the possible implementations of the sixth aspect, refer to the descriptions of the technical effects of the second aspect or the possible implementations of the second aspect.

According to a seventh aspect, a first network device is provided. The network device includes a processor, configured to implement the method described in any one of the third aspect and the possible implementations of the third aspect. The terminal device may further include a memory, configured to store program instructions and data. The memory is coupled to the processor, and the processor may invoke and execute the program instructions stored in the memory, to implement the method described in any one of the third aspect and the possible implementations of the third aspect. The network device may further include a communications interface, and the communications interface is used by the network device to communicate with another device. For example, if the network device is an independent device, the communications interface is, for example, a transceiver. For example, the another device is a terminal device. For example, the transceiver is configured to send configuration information to the terminal device, where the configuration information is used to indicate a quantity $M_{SRS}$ of first time units that are used by the terminal device to send an SRS in one subframe, and the subframe includes a plurality of first time units.

The processor is configured to determine, based on $M_{SRS}$, a first index $n'_{SRS}$ of a first time unit used to send the SRS.

The processor is further configured to determine, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The transceiver is further configured to receive, by using the antenna, the SRS in the first time unit indicated by $n'_{SRS}$.

With reference to the seventh aspect, in a possible implementation of the seventh aspect, the processor is configured to determine, in the following manner based on $M_{SRS}$, the first index $n'_{SRS}$ of the first time unit used to send the SRS: $n'_{SRS}$ satisfies the following formula:

$$n'_{SRS} = \begin{cases} \left(2N_{SP}n_f + 2(N_{SP}-1)\lfloor \frac{n_s}{10} \rfloor + \lfloor \frac{T_{offset}}{T_{offset\_max}} \rfloor\right) \times M_{SRS} + m, \\ \text{frame structure type 2 with an SRS periodicity of 2 ms} \\ \lfloor n_f \times 10 + \lfloor \frac{n_s}{2} \rfloor \rfloor / T_{SRS} \rfloor \times M_{SRS} + m, \text{other cases} \end{cases}$$

where $T_{SRS}$ represents an SRS transmission periodicity configured by the network device for the terminal device, $T_{offset}$ represents a position of a subframe that is used to send the SRS in the periodicity $T_{SRS}$ configured by the network device for the terminal device, $N_{SP}$ represents a quantity of downlink-to-uplink switching points in a radio frame in which the SRS is located, nif represents a frame number of the radio frame in which the SRS is located, $n_s$ represents a slot number in the radio frame in which the SRS is located, $n_s=0, 1, \ldots, 19$, m represents an index of a first time unit that is allocated to the terminal device to transmit the SRS in one subframe, and $m=0, 1, \ldots, M_{SRS}-1$.

With reference to the seventh aspect, in a possible implementation of the seventh aspect, the processor is further configured to:
- determine, based on a quantity of transmit antennas and a quantity of receive antennas that are corresponding to the terminal device, $n'_{SRS}$, and $M_a$ if no frequency hopping is configured for the SRS, an index of the antenna that is used to send the SRS in the first time unit and that corresponds to $n'_{SRS}$; or
- determine, based on a quantity of subbands occupied by the SRS in a frequency hopping process, $n'_{SRS}$, and $M_a$ if frequency hopping is configured for the SRS, an index of the antenna that is used to send the SRS in the first time unit and that corresponds to $n'_{SRS}$; or
- determine, based on a quantity of transmit antennas and a quantity of receive antennas that are corresponding to the terminal device, $n'_{SRS}$, and $M_a$, an index of the antenna that is used to send the SRS in the first time unit and that corresponds to $n'_{SRS}$.

With reference to the seventh aspect, in a possible implementation of the seventh aspect, when the terminal device has two antennas and sends the SRS by using one of the antennas at a same moment, the processor is configured to determine, in the following manner based on $n'_{SRS}$ and $M_a$, the antenna that is used to send the SRS in the first time unit and that corresponds to $n'_{SRS}$:
- the processor is configured to determine, in the following manner based on the quantity of transmit antennas and the quantity of receive antennas that are corresponding to the terminal device, $n'_{SRS}$, and $M_a$ if no frequency hopping is configured for the SRS, the index of the antenna that is used to send the SRS in the first time unit and that corresponds to $n'_{SRS}$, where
  the index of the antenna that is used to send the SRS in the first time unit and that corresponds to $n'_{SRS}$ satisfies the following formula: $a(n_{SRS\_ant})=n_{SRS\_ant} \mod 2$, where $a(n_{SRS\_ant})$ represents the index of the antenna that is used to send the SRS in the first time unit and that corresponds to $n'_{SRS}$, $n_{SRS\_ant}=\lfloor n'_{SRS}/M_a \rfloor$, and mod represents a modulo operation; or
- the processor is configured to determine, in the following manner based on the quantity of subbands occupied by the SRS in the frequency hopping process, $n'_{SRS}$, and $M_a$ if frequency hopping is configured for the SRS, the index of the antenna that is used to send the SRS in the first time unit and that corresponds to $n'_{SRS}$, where
  the index of the antenna that is used to send the SRS in the first time unit and that corresponds to $n'_{SRS}$ satisfies the following formula:

$$\begin{cases} \left(n_{SRS\_ant} + \lfloor n_{SRS\_ant}/2 \rfloor + \beta \cdot \left\lfloor \frac{M_a \times n_{SRS,ant}}{K} \right\rfloor \right) \mod 2, & \text{when } \frac{K}{M_a} \text{ is an even integer} \\ n_{SRS\_ant} \mod 2, & \text{other cases} \end{cases}$$

where
$a(n_{SRS\_ant})$ represents the index of the antenna that is used to send the SRS in the first time unit and that corresponds to $n'_{SRS}$, $n_{SRS\_ant}=\lfloor n'_{SRS}/M_a \rfloor$, mod represents a modulo operation, K represents the quantity of subbands occupied by the SRS in the frequency hopping process, and $$\beta = \begin{cases} 1, & \text{where } \frac{K}{M_a} \mod 4 = 0 \\ 0, & \text{other cases} \end{cases}.$$

With reference to the seventh aspect, in a possible implementation of the seventh aspect, when the terminal device has four antennas and sends the SRS by using one of the antennas at a same moment, the processor is configured to determine, in the following manner based on $n'_{SRS}$ and $M_a$, the antenna that is used to send the SRS in the first time unit and that corresponds to $n'_{SRS}$:
- the processor is configured to determine, in the following manner based on the quantity of transmit antennas and the quantity of receive antennas that are corresponding to the terminal device, $n'_{SRS}$, and $M_a$ if no frequency hopping is configured for the SRS, the index of the antenna that is used to send the SRS in the first time unit and that corresponds to $n'_{SRS}$, where
  the index of the antenna that is used to send the SRS in the first time unit and that corresponds to $n'_{SRS}$ satisfies the following formula: $a(n_{SRS\_ant})=n_{SRS\_ant} \mod 4$, where $a(n_{SRS\_ant})$ represents the index of the antenna that is used to send the SRS in the first time unit and that corresponds to $n'_{SRS}$, $n_{SRS\_ant}=\lfloor n'_{SRS}/M_a \rfloor$, and mod represents a modulo operation; or
- the processor is configured to determine, in the following manner based on the quantity of subbands occupied by the SRS in the frequency hopping process, $n'_{SRS}$, and $M_a$ if frequency hopping is configured for the SRS, the index of the antenna that is used to send the SRS in the first time unit and that corresponds to $n'_{SRS}$, where
  the index of the antenna that is used to send the SRS in the first time unit and that corresponds to $n'_{SRS}$ satisfies the following formula:

$$\begin{cases} \left(n_{SRS\_ant} + \left\lfloor \frac{n_{SRS.ant}}{\max\left(4, \frac{K}{M_a}\right)} \right\rfloor + \beta \left( \left\lfloor \frac{n_{SRS\_ant}}{4} \right\rfloor \mod \left\lfloor \frac{\max\left(4, \frac{K}{M_a}\right)}{4} \right\rfloor \right) \right) \mod 4, & \text{when } \frac{K}{M_a} \text{ is an even integer} \\ n_{SRS\_ant} \mod 4, & \text{other cases} \end{cases}$$

where
$a(n_{SRS\_ant})$ represents the index of the antenna that is used to send the SRS in the first time unit and that corresponds to $n'_{SRS}$, $n_{SRS\_ant}=\lfloor n'_{SRS}/M_a \rfloor$, K represents the quantity of subbands occupied by the SRS in the frequency hopping process, mod represents a modulo operation, and $$\beta = \begin{cases} 1, & \text{if } N_1 = 2, N_2 = 2 \\ 0, & \text{other cases} \end{cases}.$$

With reference to the seventh aspect, in a possible implementation of the seventh aspect, when the terminal device has four antennas and sends the SRS by using two of the antennas at a same moment, the processor is configured to determine, in the following manner based on n'$_{SRS}$ and M$_a$, the antenna that is used to send the SRS in the first time unit and that corresponds to n'$_{SRS}$:

the processor is configured to determine, in the following manner based on the quantity of transmit antennas and the quantity of receive antennas that are corresponding to the terminal device, n'$_{SRS}$, and M$_a$ if no frequency hopping is configured for the SRS, the index of the antenna that is used to send the SRS in the first time unit and that corresponds to n'$_{SRS}$, where the index of the antenna that is used to send the SRS in the first time unit and that corresponds to n'$_{SRS}$ satisfies the following formula: a(n$_{SRS\_ant}$)=n$_{SRS\_ant}$ mod Λ, where a(n$_{SRS\_ant}$) represents the index of the antenna that is used to send the SRS in the first time unit and that corresponds to n'$_{SRS}$, n$_{SRS\_ant}$=⌊n'$_{SRS}$/M$_a$⌋, mod represents a modulo operation, and Λ is 2 or 3; or the processor is configured to determine, in the following manner based on the quantity of subbands occupied by the SRS in the frequency hopping process, n'$_{SRS}$, and M$_a$ if frequency hopping is configured for the SRS, the index of the antenna that is used to send the SRS in the first time unit and that corresponds to n'$_{SRS}$, where the index of the antenna that is used to send the SRS in the first time unit and that corresponds to n'$_{SRS}$ satisfies the following formula:

the index of the antenna that is used to send the SRS in the first time unit and that corresponds to n'$_{SRS}$ satisfies the following formula: a(n$_{SRS\_ant}$)=n$_{SRS\_ant}$ mod 2, where a(n$_{SRS\_ant}$) represents the index of the antenna that is used to send the SRS in the first time unit and that corresponds to n'$_{SRS}$, n$_{SRS\_ant}$=⌊n'$_{SRS}$/M$_a$⌋, and mod represents a modulo operation; or when the terminal device has four antennas and sends the SRS by using one of the antennas at a same moment, the index of the antenna that is used to send the SRS in the first time unit and that corresponds to n'$_{SRS}$ satisfies the following formula: a(n$_{SRS\_ant}$)=n$_{SRS\_ant}$ mod 4, where a(n$_{SRS\_ant}$) represents the index of the antenna that is used to send the SRS in the first time unit and that corresponds to n'$_{SRS}$, n$_{SRS\_ant}$=⌊n'$_{SRS}$/M$_a$⌋, and mod represents a modulo operation; or when the terminal device has four antennas and sends the SRS by using two of the antennas at a same moment, the index of the antenna that is used to send the SRS in the first time unit and that corresponds to n'$_{SRS}$ satisfies the following formula: a(n$_{SRS\_ant}$)=n$_{SRS\_ant}$ mod Λ, where a(n$_{SRS\_ant}$) represents the index of the antenna that is used to send the SRS in the first time unit and that corresponds to n'$_{SRS}$, n$_{SRS\_ant}$=⌊n'$_{SRS}$/M$_a$⌋, mod represents a modulo operation, and Λ is 2 or 3.

With reference to the seventh aspect, in a possible implementation of the seventh aspect, the processor is further configured to:

determine, based on n'$_{SRS}$, a subband used to send the SRS.

$$a(n_{SRS\_ant}) = \begin{cases} \left(n_{SRS\_ant} + \left\lfloor \frac{n_{SRS\_ant}}{\Lambda} \right\rfloor + \beta\left(\left\lfloor \frac{M_a \times n_{SRS\_ant}}{K} \right\rfloor\right)\right) \bmod \Lambda, & \text{where } \frac{K}{M_a} \text{ is an integer and } \frac{K}{M_a} \bmod \Lambda = 0 \\ n_{SRS\_ant} \bmod \Lambda, & \text{other cases} \end{cases},$$

where a(n$_{SRS\_ant}$) represents the index of the antenna that is used to send the SRS in the first time unit and that corresponds to n'$_{SRS}$, n$_{SRS\_ant}$=⌊n'$_{SRS}$/M$_a$⌋, K represents the quantity of subbands occupied by the SRS in the frequency hopping process, mod represents a modulo operation, and $$\beta = \begin{cases} 1, & \text{if } \frac{K}{M_a} \bmod \Lambda^2 = 0 \\ 0, & \text{other cases} \end{cases}.$$

With reference to the seventh aspect, in a possible implementation of the seventh aspect, the processor is configured to determine, in the following manner based on the quantity of transmit antennas and the quantity of receive antennas that are corresponding to the terminal device, n'$_{SRS}$, and M$_a$, the index of the antenna that is used to send the SRS in the first time unit and that corresponds to n'$_{SRS}$:

when the terminal device has two antennas and sends the SRS by using one of the antennas at a same moment, With reference to the seventh aspect, in a possible implementation of the seventh aspect, the processor is configured to determine, in the following manner based on n'$_{SRS}$, the subband used to send the SRS:

an index of the subband used to send the SRS satisfies the following formula:

$$n_b = \begin{cases} \lfloor 4n_{RRC} / m_{SRS,b} \rfloor \bmod N_b, & \text{when } b \leq b_{hop} \\ \left(F_b(n_{SRS\_fh}) + \left\lfloor \frac{4n_{RRC}}{m_{SRS,b}} \right\rfloor\right) \bmod N_b, & \text{other cases} \end{cases},$$

where $$n_{SRS\_fh} = \left\lfloor \frac{n'_{SRS}}{M_a N_{ant}} \right\rfloor \times M_a + n'_{SRS} \bmod M_a, N_{ant}$$

represents a quantity of antennas in the terminal device, and $$F_b(n_{SRS\_fh}) = \begin{cases} \left(\frac{N_b}{2}\right)\left[\frac{n_{SRS\_fh} \bmod \prod_{b'=b_{hop}}^{b} N_{b'}}{\prod_{b'=b_{hop}}^{b-1} N_{b'}}\right] + \left[\frac{n_{SRS\_fh} \bmod \prod_{b'=b_{hop}}^{b} N_{b'}}{3\prod_{b'=b_{hop}}^{b-1} N_{b'}}\right] & \text{when } N_b \text{ is an even number} \\ \lfloor N_b/2 \rfloor \left\lfloor n_{SRS\_fh} / \prod_{b'=b_{hop}}^{b-1} N_{b'} \right\rfloor, & \text{when } N_b \text{ is an odd number} \end{cases},$$

where $b_{hop}$ is determined based on SRS-hopping bandwidth, $b_{hop} \square \{0, 1, 2, 3\}$, $n_{RRC}$ is determined based on a periodic SRS frequency domain position or an aperiodic SRS frequency domain position, and $B_{SRS}$, $N_b$, $N_{b'}$, and $M_{SRS,b}$ are determined based on an SRS-bandwidth configuration.

For technical effects of any one of the seventh aspect and the possible implementations of the seventh aspect, refer to the descriptions of the technical effects of the third aspect or the possible implementations of the third aspect.

According to an eighth aspect, a second network device is provided. The network device includes a processor, configured to implement the method described in any one of the fourth aspect and the possible implementations of the fourth aspect. The terminal device may further include a memory, configured to store program instructions and data. The memory is coupled to the processor, and the processor may invoke and execute the program instructions stored in the memory, to implement the method described in any one of the fourth aspect and the possible implementations of the fourth aspect. The network device may further include a communications interface, and the communications interface is used by the network device to communicate with another device. For example, if the network device is an independent device, the communications interface is, for example, a transceiver. For example, the another device is a terminal device. For example, the transceiver is configured to send configuration information to the terminal device, where the configuration information is used to indicate the terminal device to perform frequency hopping within P subbands, and P is a positive integer.

The transceiver is further configured to receive an SRS from the terminal device in a frequency hopping manner within the P subbands, where the network device traverses all of the P subbands when receiving the SRS in P first time units, and the network device traverses all transmit antennas of the terminal device when receiving the SRS in the P first time units; and the processor included in the network device determines, based on the following formula, an index of an antenna used to receive the SRS in the P first time units, where when the terminal device has two antennas and sends the SRS by using one of the antennas at a same moment, the index of the antenna used to send the SRS in the P first time units satisfies the following formula: $a(n_{SRS\_ant}) = n_{SRS\_ant} \bmod 2$, where $a(n_{SRS\_ant})$ represents the index of the antenna used to send the SRS, $n_{SRS\_ant} = \lfloor n'_{SRS}/M_a \rfloor$, and mod represents a modulo operation; or when the terminal device has four antennas and sends the SRS by using one of the antennas at a same moment, the index of the antenna used to send the SRS in the P first time units satisfies the following formula: $a(n_{SRS\_ant}) = n_{SRS\_ant} \bmod 4$, where $a(n_{SRS\_ant})$ represents the index of the antenna used to send the SRS, $n_{SRS\_ant} = \lfloor n'_{SRS}/M_a \rfloor$, and mod represents a modulo operation; or when the terminal device has four antennas and sends the SRS by using two of the antennas at a same moment, the index of the antenna used to send the SRS in the P first time units satisfies the following formula: $a(n_{SRS\_ant}) = n_{SRS\_ant} \bmod \Lambda$, where $a(n_{SRS\_ant})$ represents the index of the antenna used to send the SRS, $n_{SRS\_ant} = \lfloor n'_{SRS}/M_a \rfloor$, mod represents a modulo operation, and $\Lambda$ is 2 or 3, where $M_a$ is a quantity of first time units that are consecutively used to send the SRS in one subframe by using a same antenna, and $n'_{SRS}$ is a first index of a first time unit used to send the SRS.

With reference to the eighth aspect, in a possible implementation, $n'_{SRS}$ satisfies the following formula:

$$n'_{SRS} = \begin{cases} \left(2N_{SP}n_f + 2(N_{SP}-1)\lfloor \frac{n_s}{10} \rfloor + \lfloor \frac{T_{offset}}{T_{offset,max}} \rfloor\right) \times M_{SRS} + m, & \text{frame structure type 2 with an SRS periodicity of 2 ms} \\ \lfloor n_f \times 10 + \lfloor \frac{n_s}{2} \rfloor / T_{SRS} \rfloor \times M_{SRS} + m, & \text{other cases} \end{cases},$$

where $T_{SRS}$ represents an SRS transmission periodicity configured by the network device for the terminal device, $T_{offset}$ represents a position of a subframe that is used to send the SRS in the periodicity $T_{SRS}$ configured by the network device for the terminal device, $N_{SP}$ represents a quantity of downlink-to-uplink switching points in a radio frame in which the SRS is located, $n_f$ represents a frame number of the radio frame in which the SRS is located, $n_s$ represents a slot number in the radio frame in which the SRS is located, $n_s=0, 1, \ldots, 19$, $M_{SRS}$ represents a quantity of first time units that are allocated to the terminal device to transmit the SRS in one subframe, m represents an index of a first time unit that is allocated to the terminal device to transmit the SRS in one subframe, and $m=0, 1, \ldots, M_{SRS}-1$.

With reference to the eighth aspect, in a possible implementation, the first time unit is one symbol or H consecutive symbols, and H is an integer greater than or equal to 2.

For technical effects of any one of the eighth aspect and the possible implementations of the eighth aspect, refer to the descriptions of the technical effects of the fourth aspect or the possible implementations of the fourth aspect.

According to a ninth aspect, a third terminal device is provided. The terminal device may be an independent device or a chip disposed in a device. A function of the terminal device may be implemented by hardware, or may be implemented by hardware executing corresponding software. The hardware or the software includes one or more modules (or units) corresponding to the foregoing function.

In a possible design, a specific structure of the terminal device may include a processing module and a transceiver module. The processing module and the transceiver module may perform corresponding functions in the method provided in any one of the first aspect and the possible implementations of the first aspect. For example, the processing module may perform a function performed by the processor in any one of the fifth aspect and the possible implementations of the fifth aspect, and the transceiver module may perform a function performed by the transceiver in any one of the fifth aspect and the possible implementations of the fifth aspect.

According to a tenth aspect, a fourth terminal device is provided. The terminal device may be an independent device or a chip disposed in a device. A function of the terminal device may be implemented by hardware, or may be implemented by hardware executing corresponding software. The hardware or the software includes one or more modules (or units) corresponding to the foregoing function.

In a possible design, a specific structure of the terminal device may include a processing module and a transceiver module. The processing module and the transceiver module may perform corresponding functions in the method provided in any one of the second aspect and the possible implementations of the second aspect. For example, the processing module may perform a function performed by the processor in any one of the sixth aspect and the possible implementations of the sixth aspect, and the transceiver module may perform a function performed by the transceiver in any one of the sixth aspect and the possible implementations of the sixth aspect.

According to an eleventh aspect, a third network device is provided. The network device may be an independent device or a chip disposed in a device. A function of the network device may be implemented by hardware, or may be implemented by hardware executing corresponding software. The hardware or the software includes one or more modules (or units) corresponding to the foregoing function.

In a possible design, a specific structure of the network device may include a processing module and a transceiver module. The processing module and the transceiver module may perform corresponding functions in the method provided in any one of the third aspect and the possible implementations of the third aspect. The processing module may perform a function performed by the processor in any one of the seventh aspect and the possible implementations of the seventh aspect, and the transceiver module may perform a function performed by the transceiver in any one of the seventh aspect and the possible implementations of the seventh aspect.

According to a twelfth aspect, a fourth network device is provided. The network device may be an independent device or a chip disposed in a device. A function of the network device may be implemented by hardware, or may be implemented by hardware executing corresponding software. The hardware or the software includes one or more modules (or units) corresponding to the foregoing function.

In a possible design, a specific structure of the network device may include a processing module and a transceiver module. The processing module and the transceiver module may perform corresponding functions in the method provided in any one of the fourth aspect and the possible implementations of the fourth aspect. The processing module may perform a function performed by the processor in any one of the eighth aspect and the possible implementations of the eighth aspect, and the transceiver module may perform a function performed by the transceiver in any one of the eighth aspect and the possible implementations of the eighth aspect.

According to a thirteenth aspect, a computer-readable storage medium is provided, including instructions. When the instructions are run on a computer, the computer is enabled to perform the method in any one of the first aspect and the possible implementations of the first aspect.

According to a fourteenth aspect, a computer-readable storage medium is provided, including instructions. When the instructions are run on a computer, the computer is enabled to perform the method in any one of the second aspect and the possible implementations of the second aspect.

According to a fifteenth aspect, a computer-readable storage medium is provided, including instructions. When the instructions are run on a computer, the computer is enabled to perform the method in any one of the third aspect and the possible implementations of the third aspect.

According to a sixteenth aspect, a computer-readable storage medium is provided, including instructions. When the instructions are run on a computer, the computer is enabled to perform the method in any one of the fourth aspect and the possible implementations of the fourth aspect.

According to a seventeenth aspect, a computer program product including instructions is provided. The computer program product stores the instructions. When the instructions are run on a computer, the computer is enabled to perform the method in any one of the first aspect and the possible designs of the first aspect.

According to an eighteenth aspect, a computer program product including instructions is provided. The computer program product stores the instructions. When the instructions are run on a computer, the computer is enabled to perform the method in any one of the second aspect and the possible designs of the second aspect.

According to a nineteenth aspect, a computer program product including instructions is provided. The computer program product stores the instructions. When the instructions are run on a computer, the computer is enabled to perform the method in any one of the third aspect and the possible designs of the third aspect.

According to a twentieth aspect, a computer program product including instructions is provided. The computer program product stores the instructions. When the instructions are run on a computer, the computer is enabled to perform the method in any one of the fourth aspect and the possible designs of the fourth aspect.

According to a twenty-first aspect, a fifth terminal device is provided. The terminal device may be an independent device or a chip disposed in a device. The terminal device includes: a memory, configured to store computer executable program code; and a processor, where the processor is coupled to the memory. The program code stored in the memory includes instructions, and when the processor executes the instructions, a sixth communications apparatus is enabled to perform the method in any one of the first aspect and the possible implementations of the first aspect.

The terminal device may further include a communications interface. If the terminal device is an independent device, the communications interface may be a transceiver in the terminal device, for example, a radio frequency transceiver component in a device; or if the terminal device is a chip disposed in a device, the communications interface may be an input/output interface of the chip, for example, an input/output pin. The communications interface may be connected to the radio frequency transceiver component in the device in which the terminal device is located, to implement information receiving and sending by using the radio frequency transceiver component.

According to a twenty-second aspect, a sixth terminal device is provided. The terminal device may be an independent device or a chip disposed in a device. The terminal device includes: a memory, configured to store computer executable program code; and a processor, where the processor is coupled to the memory. The program code stored in the memory includes instructions, and when the processor executes the instructions, a sixth communications apparatus is enabled to perform the method in any one of the second aspect and the possible implementations of the second aspect.

The terminal device may further include a communications interface. If the terminal device is an independent device, the communications interface may be a transceiver in the terminal device, for example, a radio frequency transceiver component in a device; or if the terminal device is a chip disposed in a device, the communications interface may be an input/output interface of the chip, for example, an input/output pin. The communications interface may be connected to the radio frequency transceiver component in the device in which the terminal device is located, to implement information receiving and sending by using the radio frequency transceiver component.

According to a twenty-third aspect, a fifth network device is provided. The network device may be an independent device or a chip disposed in a device. The network device includes: a memory, configured to store computer executable program code; and a processor, where the processor is coupled to the memory. The program code stored in the memory includes instructions, and when the processor executes the instructions, a sixth communications apparatus is enabled to perform the method in any one of the third aspect and the possible implementations of the third aspect.

The network device may further include a communications interface. If the network device is an independent device, the communications interface may be a transceiver in the network device, for example, a radio frequency transceiver component in a device; or if the network device is a chip disposed in a device, the communications interface may be an input/output interface of the chip, for example, an input/output pin. The communications interface may be connected to the radio frequency transceiver component in the device in which the network device is located, to implement information receiving and sending by using the radio frequency transceiver component.

According to a twenty-fourth aspect, a sixth network device is provided. The network device may be an independent device or a chip disposed in a device. The network device includes: a memory, configured to store computer executable program code; and a processor, where the processor is coupled to the memory. The program code stored in the memory includes instructions, and when the processor executes the instructions, a sixth communications apparatus is enabled to perform the method in any one of the fourth aspect and the possible implementations of the fourth aspect.

The network device may further include a communications interface. If the network device is an independent device, the communications interface may be a transceiver in the network device, for example, a radio frequency transceiver component in a device; or if the network device is a chip disposed in a device, the communications interface may be an input/output interface of the chip, for example, an input/output pin. The communications interface may be connected to the radio frequency transceiver component in the device in which the network device is located, to implement information receiving and sending by using the radio frequency transceiver component.

According to a twenty-fifth aspect, a first communications system is provided. The communications system includes the terminal device in any one of the fifth aspect and the possible implementations of the fifth aspect, the terminal device in any one of the ninth aspect and the possible implementations of the ninth aspect, or the terminal device in the twenty-first aspect, and includes the network device in any one of the seventh aspect and the possible implementations of the seventh aspect, the network device in any one of the eleventh aspect and the possible implementations of the eleventh aspect, or the network device in the twenty-third aspect.

According to a twelfth aspect, a second communications system is provided. The communications system includes the terminal device in any one of the sixth aspect and the possible implementations of the sixth aspect, the terminal device in any one of the tenth aspect and the possible implementations of the tenth aspect, or the terminal device in the twenty-second aspect, and includes the network device in any one of the eighth aspect and the possible implementations of the eighth aspect, the network device in any one of the twelfth aspect and the possible implementations of the twelfth aspect, or the network device in the twenty-fourth aspect.

In the embodiments of this application, a manner of determining an antenna for sending an SRS is provided. In addition, a case in which one subframe includes a plurality of first time units is considered by using $M_{SRS}$ and a case in which one antenna is enabled to implement continuous sending as much as possible is also considered by using $M_a$, so that a same antenna can be enabled to implement continuous sending in one subframe as much as possible, thereby minimizing an antenna switching process.

DESCRIPTION OF EMBODIMENTS

Figure 1:
FIG. 1 is a schematic diagram of sending an SRS on the last symbol of an uplink subframe in a current LTE system.

To make the objectives, the technical solutions, and advantages of the embodiments of this application clearer, the following further describes the embodiments of this application in detail with reference to the accompanying drawings.

In the following descriptions, some terms in the embodiments of this application are described, to help a person skilled in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station a mobile station, a remote station, an access point (AP), a remote terminal device, an access terminal device, a user terminal device, a user agent, a user device, or the like. For example, the terminal device may include a mobile phone (which may be referred to as a "cellular" phone), a computer having a mobile terminal device, a portable, pocket-sized, handheld, or computer built-in mobile apparatus, a smart wearable device, or the like. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, but not limitation, the terminal device in the embodiments of this application may alternatively be a wearable device or the like. The wearable device may also be referred to as a wearable intelligent device, and is a general term for wearable device such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is used to implement powerful functions through software support, data exchange, and cloud interaction. Generalized wearable intelligent devices include full-featured and large-size devices, such as smart watches or smart glasses, that can implement complete or partial functions without depending on smartphones, and devices, such as various smart bands, smart helmets, or smart jewelry for monitoring physical signs, that focus on only one type of application functions and need to work with other devices such as smartphones.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBU).

(2) A network device, for example, includes an access network (AN) device such as a base station (for example, an access point), and may be a device that communicates with a wireless terminal device over an air interface in an access network by using one or more cells. Alternatively, for example, a network device in a V2X technology is a roadside unit (RSU). The base station may be configured to mutually convert a received over-the-air frame and an internet protocol (IP) packet and serve as a router between the terminal device and a rest portion of the access network. The rest portion of the access network may include an IP network. The RSU may be a fixed infrastructure entity that supports a V2X application, and may exchange a message with another entity that supports the V2X application. The network device may further coordinate attribute management of the air interface. For example, the network device may include an evolved NodeB (eNB or e-NodeB) in a long term evolution (LTE) system or an LTE-advanced system (LTE-A), or may include a next generation NodeB (gNB) in a fifth generation (5G) new radio (NR) system, or may include a centralized unit (CU) and a distributed unit (DU) in a cloud radio access network (CloudRAN) system. This is not limited in the embodiments of this application.

(3) Multiple-input multiple-output (MIMO) means that a transmit end and a receive end respectively use a plurality of transmit antennas and a plurality of receive antennas to transmit a signal, to improve communication quality. In MIMO, spatial resources can be fully used, and multiple-output multiple-input is implemented by using a plurality of antennas, so that a system channel capacity is exponentially increased without increasing spectrum resources and antenna transmit power. MIMO is considered as a core technology of next-generation mobile communication due to the obvious advantage.

(4) An antenna is a physical component or a logical channel for sending a signal by a base station device or a terminal device, or is used to indicate a port of a specified signal transmit antenna.

(5) The terms "system" and "network" may be interchangeably used in the embodiments of this application. "A plurality of" means two or more. In view of this, "a plurality of" may also be understood as "at least two" in the embodiments of this application. "At least one" may be understood as one or more, for example, understood as one, two, or more. For example, "include at least one" means including one, two, or more, and does not limit which items are included. For example, including at least one of A, B, and C may represent the following cases: A is included, B is included, C is included, A and B are included, A and C are included, B and C are included, or A and B and C are included. Similarly, an understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/", unless otherwise specified, usually represents an "or" relationship between the associated objects.

Unless otherwise stated, ordinal terms such as "first" and "second" mentioned in the embodiments of this application are used to distinguish between a plurality of objects, and are not intended to limit a sequence, a time sequence, a priority, or an importance degree of the plurality of objects. For example, a first time unit and a second time unit are merely intended to distinguish between different time domain resources, but are not intended to limit a priority, a length, a time domain sequence, an importance degree, or the like of the two time domain resources.

The foregoing describes some concepts related to the embodiments of this application, and the following describes technical features of the embodiments of this application.

A multiple-input multiple-output (MIMO) technology is widely used in an LTE system. When a network device has a plurality of transmit antenna ports and a terminal device has a plurality of receive antenna ports, the network device may simultaneously send a plurality of parallel data streams to the terminal device.

In a TDD system, an uplink channel and a downlink channel have reciprocity. The terminal device sends an SRS in an uplink, and the network device may estimate an uplink channel by using the SRS, and may obtain a downlink beamforming weight value based on the uplink channel.

In actual application, a quantity of receive antennas of the terminal device is greater than a quantity of transmit antennas because each transmit antenna of the terminal device needs to be connected to one power amplifier (PA). Costs of the power amplifier are relatively high, and therefore only one or two PAs are usually configured for the terminal device. Therefore, the quantity of receive antennas of the terminal device is greater than the quantity of transmit antennas. In this case, the uplink channel and a downlink channel that are estimated by the network device based on the SRS are no longer symmetrical.

Figure 2A:
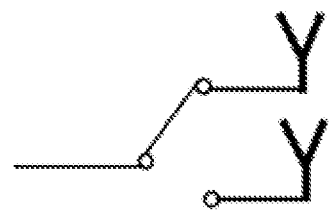
FIG. 2A to FIG. 2C are schematic diagrams of several antenna configuration cases of a terminal device.
Figure 2B:
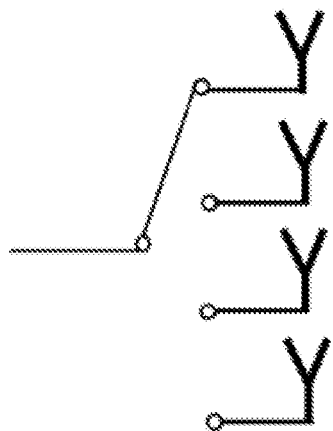
Figure 2C:
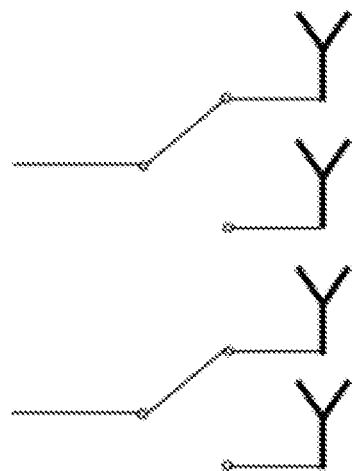

To overcome this problem, antenna selection is defined in an existing LTE protocol. To be specific, a link between a PA and an antenna in the terminal device may be dynamically changed, and the terminal device may be capable of dynamically adjusting an antenna port for sending an uplink signal. In an existing LTE release 9 (Rel-9) protocol, the terminal device supports a dynamic link between two antennas for one PA in the uplink. This scenario is referred to as 1T2R. For this, refer to FIG. 2A. In addition, 1T2R may also be understood as that the terminal device has two antennas and sends a signal by using one of the antennas at a same moment. In an LTE release 15 (Rel-15), antenna selection for 1T4R and 2T4R is already supported. For 1T4R, refer to FIG. 2B. For 2T4R, refer to FIG. 2C. 1T4R may also be understood that the terminal device has four antennas and sends a signal by using one of the antennas at a same moment, and 2T4R may also be understood that the terminal device has four antennas and sends a signal by using two of the antennas at a same moment.

In an existing LTE standard, the SRS may be sent on the last symbol of an uplink subframe. As shown in FIG. 1, the SRS is sent on a symbol shown in a part marked with slashes in FIG. 1.

To support antenna selection and frequency hopping of an SRS, a formula for antenna selection is defined in an LTE protocol. Based on the formula, the network device and the terminal device may determine an antenna used to send the SRS.

In an LTE release 16, it has been determined that more symbols may be used to transmit the SRS in one uplink subframe. In this case, how to determine an antenna for sending an SRS is a problem that needs to be resolved.

In view of this, the technical solutions in the embodiments of this application are provided. In the embodiments of this application, a terminal device may determine, based on a quantity $M_{SRS}$ of first time units that are used by the terminal device to send an SRS in one uplink subframe, a first index $n'_{SRS}$ of a first time unit used to send the SRS, and then may determine, based on $n'_{SRS}$ and a quantity $M_a$ of first time units that are consecutively used to send the SRS in one subframe by using a same antenna, an antenna that is used to send the SRS in a first time unit and that corresponds to $n'_{SRS}$. Therefore, a case in which one subframe includes a plurality of first time units is considered by using $M_{SRS}$ and a case in which one antenna is enabled to implement continuous sending as much as possible is also considered by using $M_a$. It may be learned that in the technical solutions provided in the embodiments of this application, a manner of determining an antenna for sending an SRS is provided, and a same antenna can be enabled to implement continuous sending as much as possible, thereby minimizing an antenna switching process.

The technical solutions provided in the embodiments of this application may be applied to the LTE system, or a next-generation mobile communications system or another similar communications system. This is not specifically limited.

Figure 3:
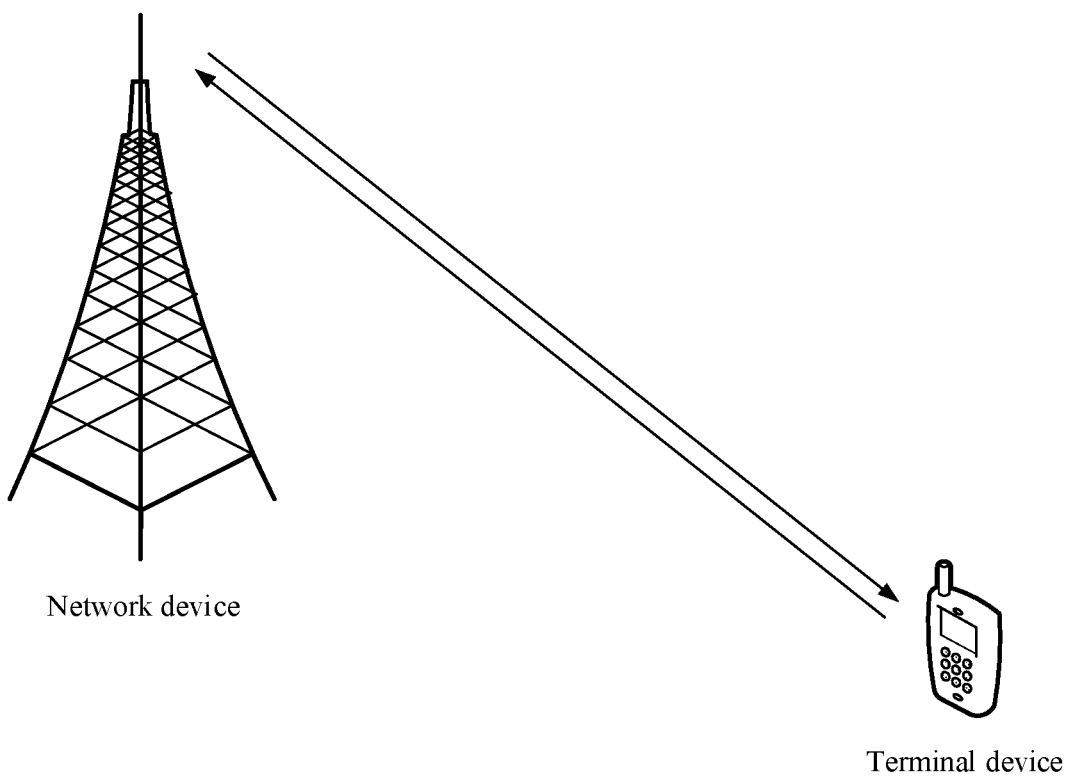
FIG. 3 is a schematic diagram of an application scenario according to an embodiment of this application.

Referring to FIG. 3, the following describes a network architecture to which the embodiments of this application are applied.

FIG. 3 includes a network device and a terminal device, and the terminal device is connected to one network device. Certainly, a quantity of terminal devices in FIG. 3 is merely an example. In actual application, the network device may serve a plurality of terminal devices. All or some of the plurality of terminal devices may determine, in a manner provided in the embodiments of this application, an antenna used to send an SRS.

The network device in FIG. 3 is, for example, an access network device such as a base station. The access network device corresponds to different devices in different systems. For example, the access network device corresponds to an eNB in a 4th generation (4G) system, and corresponds to a 5G access network device in a 5G system, for example, a gNB.

The following describes the technical solutions provided in the embodiments of this application with reference to the accompanying drawings.

Figure 4:
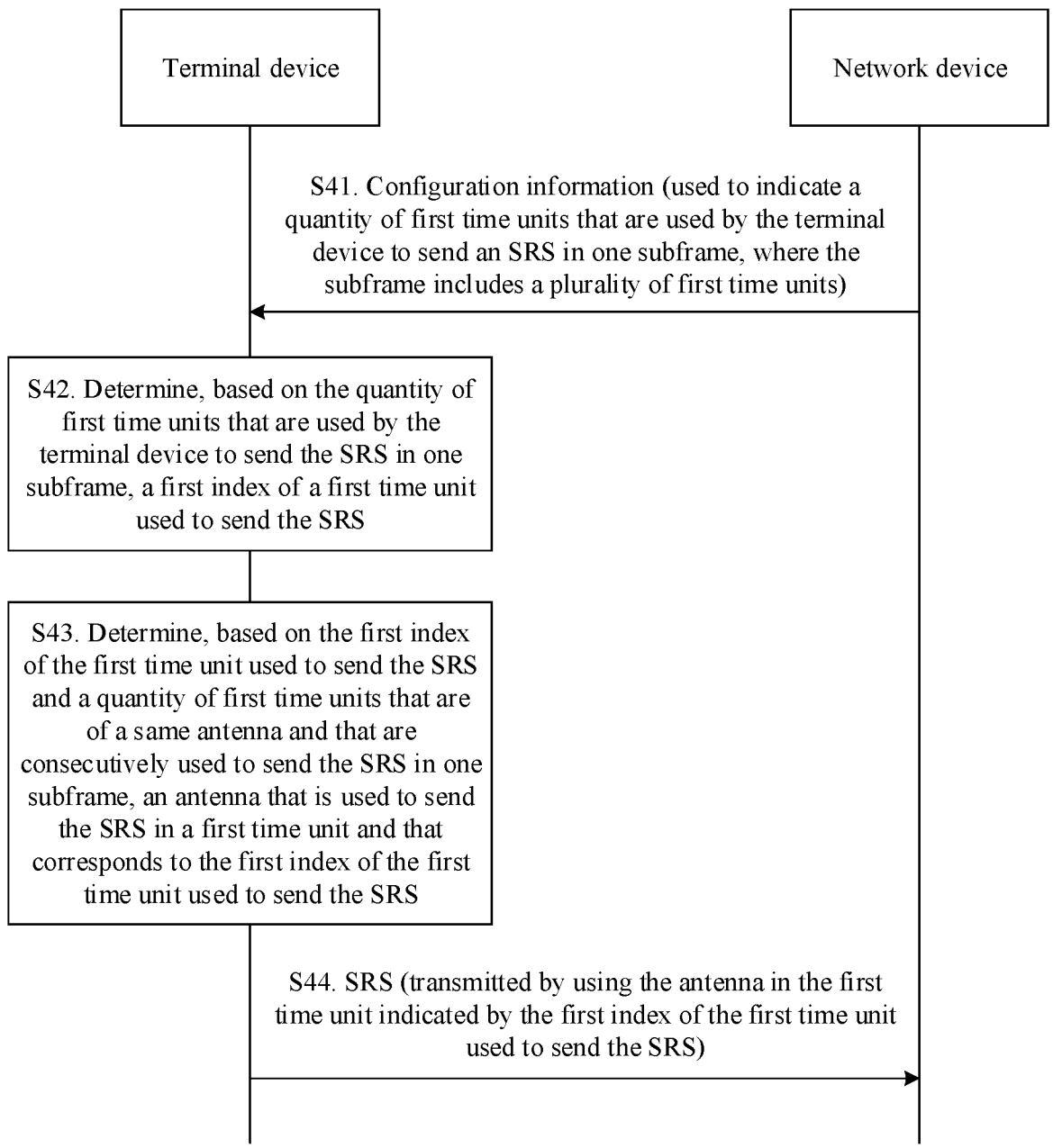
FIG. 4 is a flowchart of a first SRS sending and receiving method according to an embodiment of this application.

An embodiment of this application provides a first SRS sending and receiving method. FIG. 4 is a flowchart of the method. In the following description process, for example, the method is applied to the network architecture shown in FIG. 3. In addition, the method may be performed by two communications apparatuses. The two communications apparatuses are, for example, a first communications apparatus and a second communications apparatus. The first communications apparatus may be a network device or a communications apparatus that can support a network device in implementing a function required by the method, or the first communications apparatus may be a terminal device or a communications apparatus that can support a terminal device in implementing a function required by the method. Certainly, the first communications apparatus may be another communications apparatus, for example, a chip system. The same is true for the second communications apparatus. The second communications apparatus may be a network device or a communications apparatus that can support a network device in implementing a function required by the method, or the second communications apparatus may be a terminal device or a communications apparatus that can support a terminal device in implementing a function required by the method. Certainly, the second communications apparatus may be another communications apparatus, for example, a chip system. In addition, implementations of the first communications apparatus and the second communications apparatus are not limited. For example, the first communications apparatus may be a network device, and the second communications apparatus is a terminal device, or both the first communications apparatus and the second communications apparatus are network devices, or both the first communications apparatus and the second communications apparatus are terminal devices, or the first communications apparatus is a network device, and the second communications apparatus is a communications apparatus that can support a terminal device in implementing a function required by the method. The network device is, for example, a base station.

For ease of description, the following uses an example in which the method is performed by a network device and a terminal device, that is, an example in which the first communications apparatus is a network device and the second communications apparatus is a terminal device. Because an example in which this embodiment is applied to the network architecture shown in FIG. 3 is used, the network device described below may be a network device in the network architecture shown in FIG. 3, and the terminal device described below may be a terminal device in the network architecture shown in FIG. 3.

S41. A network device sends configuration information to a terminal device, and the terminal device receives the configuration information from the network device, where the configuration information is used to indicate a quantity $M_{SRS}$ of first time units that are used by the terminal device to send an SRS in one subframe, and the subframe includes a plurality of first time units.

Alternatively, the configuration information may be used to indicate a quantity of first time units that are used by the terminal device to send an SRS in one second time unit, and the second time unit may include a plurality of first time units. The second time unit is, for example, a subframe or a slot. In the descriptions of this specification, for example, the second time unit is a subframe. The first time unit may be one symbol or H consecutive symbols, and H is an integer greater than or equal to 2.

For example, the first time unit is one symbol. A plurality of symbols may be used to send the SRS in one subframe, and may be predefined in a protocol. However, for different terminal devices, a quantity of symbols used to send the SRS in one subframe may be configured by the network device. For example, the protocol specifies that four symbols may be used to send the SRS in one subframe. In this case, a quantity, configured by the network device for each terminal device, of symbols that can be used to send the SRS in one subframe may be less than or equal to 4. For example, for the terminal device, the network device may determine a quantity of first time units that are used by the terminal device to send the SRS in one subframe, and notify the terminal device of the quantity by using the configuration information. Therefore, after receiving the configuration information, the terminal device may determine the quantity of first time units that may be used to send the SRS in one subframe. The quantity of first time units that are used by the terminal device to send the SRS in one subframe is, for example, represented by $M_{SRS}$.

S42. The terminal device determines, based on $M_{SRS}$, a first index $n'_{SRS}$ of a first time unit used to send the SRS.

After determining $M_{SRS}$, the terminal device may determine, based on $M_{SRS}$, the first index of the first time unit used to send the SRS. For example, the first index is represented by $n'_{SRS}$. First time units used to send the SRS may be located in one or more subframes, and $n'_{SRS}$ may be used to uniformly index the first time units located in the one or more subframes. The "first index" in this specification is a relative index, and is not an index of a corresponding time unit in a subframe or in a radio frame. For example, the first index of the first time unit herein is a relative index of the first time unit, and is not an index of the first time unit in a subframe or in a radio frame. For example, the terminal device sends the SRS in two subframes, and sends the SRS in each subframe by using four symbols. If a first time unit is one symbol, first indexes of symbols used to send the SRS may be 1 to 8 (or 0 to 7). In other words, the first index means that only symbols used to send the SRS in each subframe are uniformly indexed, and symbols that are not used to send the SRS in the subframe are not included in an index range. Continuing the foregoing example, in one subframe, symbols used to send the SRS may be the last four symbols in the subframe, and indexes of the last four symbols in one subframe should be 8 to 11. For example, if the subframe is the first subframe used to send the SRS, first indexes of the four symbols are 1 to 4 (or 0 to 3).

In this embodiment of this application, because a plurality of first time units may be used to send the SRS in one subframe, the plurality of first time units need to be considered when the first index $n'_{SRS}$ of the first time unit used to send the SRS is being determined. In an implementation, $n'_{SRS}$ may satisfy the following formula:

$$n'_{SRS} = \begin{cases} \left(2N_{SP}n_f + 2(N_{SP}-1)\left\lfloor \frac{n_s}{10} \right\rfloor + \left\lfloor \frac{T_{offset}}{T_{offset,max}} \right\rfloor\right) \times M_{SRS} + m, & \text{frame structure type 2 with an SRS period of 2 ms} \\ \left\lfloor \left(n_f \times 10 + \left\lfloor \frac{n_s}{2} \right\rfloor\right) / T_{SRS} \right\rfloor \times M_{SRS} + m, & \text{other cases} \end{cases} \quad \text{(Formula 1)}$$

terminal device to send an SRS in one second time unit, and the second time unit may include a plurality of first time units. The second time unit is, for example, a subframe or a slot. In the descriptions of this specification, for example, the second time unit is a subframe. The first time unit may be one symbol or H consecutive symbols, and H is an integer greater than or equal to 2.

$T_{SRS}$ represents an SRS transmission periodicity configured by the network device for the terminal device, $T_{offset}$ represents a position of a subframe that is used to send the SRS in the periodicity $T_{SRS}$ configured by the network device for the terminal device, $N_{SP}$ represents a quantity of downlink-to-uplink switching points in a radio frame in which the SRS is located, $n_f$ represents a frame number of the radio frame in which the SRS is located, $n_s$ represents a slot number in the radio frame in which the SRS is located, $n_s$=0, 1, . . . , 19, m represents a first index of a first time unit that is allocated to the terminal device to transmit the SRS in one subframe, m=0, 1, . . . , $M_{SRS}$−1, and ⌊ ⌋ represents rounding down.

Figure 5:
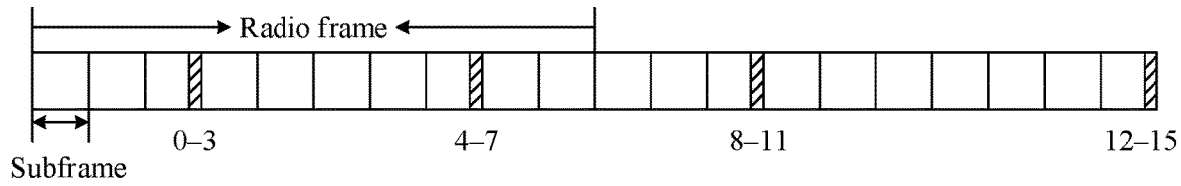
FIG. 5 is a schematic diagram in which a terminal device sends an SRS on a plurality of symbols in one subframe according to an embodiment of this application.

For example, $T_{SRS}$ is 5 ms. The terminal device sends the SRS in the last four symbols in a subframe 2 of each radio frame. For ages, refer to FIG. 5. 0 to 3, 4 to 7, and the like in FIG. 5 represent $n'_{SRS}$ of symbols. For example, 0 to 3 represent $n'_{SRS}$ of four symbols. FIG. 5 shows only a part of the radio frame, that is, only a part of values of $n'_{SRS}$ are shown, and there are no more examples. In addition, FIG. 5 is merely an example in which the terminal device sends the SRS in two subframes of one radio frame. In this embodiment of this application, the terminal device may alternatively send the SRS in one subframe of one radio frame, or may send the SRS in three or more subframes of one radio frame.

For example, $n_{SRS}$ is further used to indicate a first index of a subframe used to send the SRS. Similarly, the first index of the subframe is not an index of the subframe in a radio frame but is used to uniformly index subframes used to send the SRS, and a subframe that is not used to send the SRS is not included in an index range. However, in this embodiment of this application, a symbol used to send the SRS in a subframe needs to be determined. Therefore, it may also be considered that $n'_{SRS}$ satisfies the following formula:

$$n'_{SRS} = n_{SRS} \times M_{SRS} + m \quad \text{(Formula 2)}$$

It may be considered that formula 2 and formula 1 are equivalent.

In the formula:

To overcome this case, the following two manners are considered in this embodiment of this application.

Figure 6A:
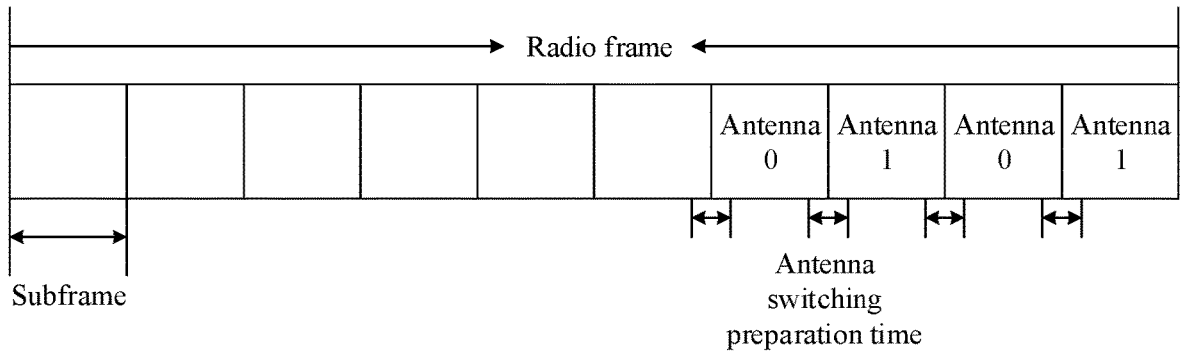
FIG. 6A is a schematic diagram in which a terminal device performs antenna switching on each symbol in one subframe.
Figure 6B:
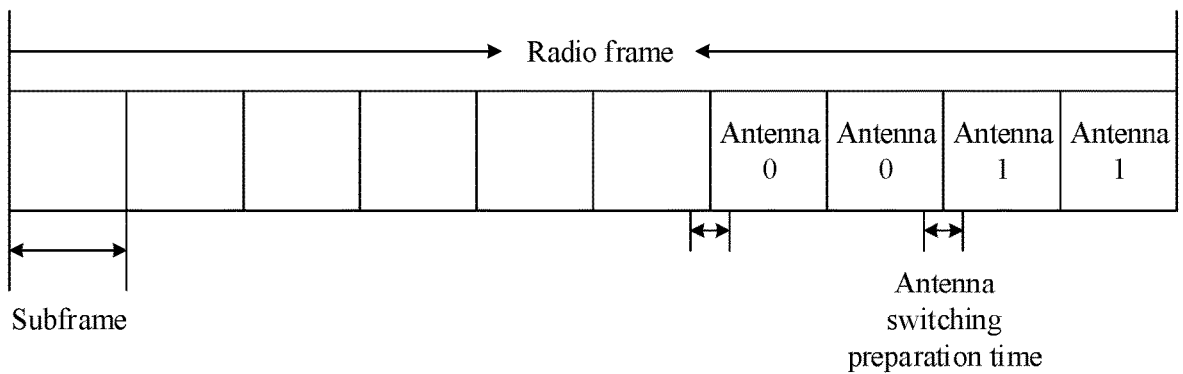
FIG. 6B is a schematic diagram in which an SRS is sent on consecutive symbols in one subframe by using a same antenna of a terminal device according to an embodiment of this application.

Manner 1: Antenna switching is supported in one subframe, but a same antenna can be used for transmission on consecutive symbols as much as possible, or in other words, the symbols corresponding to the same antenna are as consecutive as possible. For this, refer to FIG. 6B. In FIG. 6B, for example, the terminal device may send an SRS in one subframe by using the last four symbols of the subframe. It may be learned that, on the four symbols of the subframe, the terminal device may perform transmission on two consecutive symbols by using an antenna 0, and perform transmission on two consecutive symbols by using an antenna 1. Therefore, a quantity of antenna switching times in the subframe is reduced.

Figure 6C:
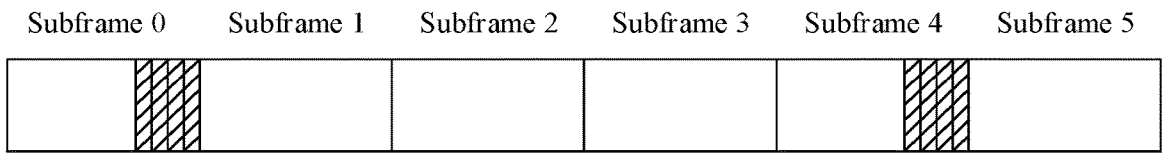
FIG. 6C is a schematic diagram in which a terminal device does not perform antenna switching in one subframe according to an embodiment of this application.

Manner 2: Antenna switching in a subframe is not supported, and antenna switching can be performed only between subframes. For this, refer to FIG. 6C. In FIG. 6C, for example, the terminal device may send an SRS in one subframe by using the last four symbols of the subframe. A symbol marked with slashes in FIG. 6C represents a symbol used to send the SRS. On the four symbols of the subframe, the terminal device performs sending by using only one antenna, and the terminal device switches the antenna in a next subframe used to send the SRS, thereby reducing a quantity of antenna switching times.

Regardless of manner 1 or manner 2, a same antenna may be used to send an SRS on several consecutive symbols.

In this case, since manner 1 or manner 2 needs to be considered, the quantity of first time units that are consecutively used to send the SRS in one subframe by using the same antenna also needs to be considered. Therefore, when $$n_{SRS} = \begin{cases} \left( 2N_{SP} n_f + 2(N_{SP} - 1) \lfloor \frac{n_s}{10} \rfloor + \lfloor \frac{T_{offset}}{T_{offset,max}} \rfloor \right), & \text{frame structure type 2 with an } SRS \text{ period of 2 ms} \\ \lfloor n_f \times 10 + \lfloor \frac{n_s}{2} \rfloor \rfloor / T_{SRS}, & \text{other cases} \end{cases} \quad \text{(Formula 3)}$$

Certainly, a manner of determining $n'_{SRS}$ is not limited in this embodiment of this application, and Naps may be determined in another manner, provided that $M_{SRS}$ is considered during the determining of $n'_{SRS}$.

S43. The terminal device determines, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The terminal device requires a specific time to switch an antenna used to send the SRS. Therefore, frequent antenna switching in one subframe wastes a lot of time-frequency resources. For example, four symbols in one subframe are allocated to the terminal device to send the SRS. If the terminal device performs antenna switching on each symbol, a lot of antenna switching preparation time is actually wasted. For this, refer to FIG. 6A. In FIG. 6A, for example, the terminal device may send an SRS in one subframe by using the last four symbols of the subframe. It may be learned that, on the four symbols, the terminal device frequently switches an antenna used to send the SRS. It should be noted that the terminal device cannot send a signal within an antenna switching preparation time.

the antenna used to send the SRS in the first time unit is being determined, the quantity of first time units that are consecutively used to send the SRS in one subframe by using the same antenna also needs to be considered in addition to $n'_{SRS}$. The quantity of first time units that are consecutively used to send the SRS in one subframe by using the same antenna is, for example, represented by $M_a$. In addition, the determined antenna used to send the SRS in the first time unit may correspond to $n'_{SRS}$ because $n'_{SRS}$ is the first index of the first time unit used to send the SRS.

In this embodiment of this application, the terminal device may further perform frequency hopping in a process of sending the SRS. In this case, when the antenna that is used to send the SRS in the first time unit and that corresponds to $n'_{SRS}$ is being determined, a determining manner may be related to whether frequency hopping is performed. This antenna determining manner may be applicable to both manner 1 and manner 2.

For example, the terminal device may determine, based on a quantity of transmit antennas and a quantity of receive antennas that are corresponding to the terminal device, $n'_{SRS}$, and $M_a$ if no frequency hopping is configured for the SRS, an index of the antenna that is used to send the SRS in the first time unit and that corresponds to $n'_{SRS}$.

Alternatively, the terminal device may determine, based on a quantity of subbands occupied by the SRS in a frequency hopping process, $n'_{SRS}$, and $M_a$ if frequency hopping is configured for the SRS, an index of the antenna that is used to send the SRS in the first time unit and that corresponds to $n'_{SRS}$.

Alternatively, regardless of whether the terminal device performs frequency hopping in the process of sending the SRS, a unified manner may be used to determine the antenna that is used to send the SRS in the first time unit and that corresponds to $n'_{SRS}$. For example, regardless of whether the terminal device performs frequency hopping in the process of sending the SRS, the terminal device may determine, based on a quantity of transmit antennas and a quantity of receive antennas that are corresponding to the terminal device, $n'_{SRS}$, and $M_a$, an index of the antenna that is used to send the SRS in the first time unit and that corresponds to $n'_{SRS}$. This antenna determining manner may also be applicable to both manner 1 and manner 2.

The following separately describes the foregoing several antenna determining manners. When the antenna that is used to send the SRS in the first time unit and that corresponds to $n'_{SRS}$ is being determined, a quantity of antennas of the terminal device is further related. Therefore, in the process of determining the antenna, the quantity of antennas of the terminal device is further considered, or in other words, the quantity of transmit antennas and the quantity of receive antennas of the terminal device are considered.

1. When the antenna that is used to send the SRS in the first time unit and that corresponds to $n'_{SRS}$ is being determined, a determining manner is related to whether frequency hopping is performed. In this case, the terminal device may determine, based on the quantity of transmit antennas and the quantity of receive antennas that are corresponding to the terminal device, $n'_{SRS}$, and $M_a$ if no frequency hopping is configured for the SRS, the index of the antenna that is used to send the SRS in the first time unit and that corresponds to $n'_{SRS}$.

For example, when the terminal device has two antennas and sends the SRS by using one of the antennas at a same moment, or in other words, the terminal device is set to 1T2R, the index of the antenna that is used to send the SRS in the first time unit and that corresponds to $n'_{SRS}$ may satisfy the following formula:

$$a(n_{SRS\_ant}) = n_{SRS\_ant} \bmod 2 \quad \text{(Formula 4)}$$

In formula 4, $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, and mod represents a modulo operation.

Alternatively, when the terminal device has four antennas and sends the SRS by using one of the antennas at a same moment, or in other words, the terminal device is set to 1T4R, the index of the antenna that is used to send the SRS in the first time unit and that corresponds to $n'_{SRS}$ may satisfy the following formula:

$$a(n_{SRS\_ant}) = n_{SRS\_ant} \bmod 4 \quad \text{(Formula 5)}$$

In formula 5, $a(n_{SRS\_ant})$ represents the index of the antenna that is used to send the SRS in the first time unit and that corresponds to $n'_{SRS}$, and $n_{SRS\_ant} = \lfloor n'_{SRS}/M_a \rfloor$.

Alternatively, when the terminal device has four antennas and sends the SRS by using two of the antennas at a same moment, or in other words, the terminal device is set to 2T4R, the index of the antenna that is used to send the SRS in the first time unit and that corresponds to $n'_{SRS}$ may satisfy the following formula:

$$a(n_{SRS\_ant}) = n_{SRS\_ant} \bmod \Lambda \quad \text{(Formula 6)}$$

In formula 6, $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, and $\Lambda$ is 2 or 3. $\Lambda$ may be understood as a quantity of antenna pairs (pair) in the terminal device. For example, in 2T4R, antenna ports for simultaneously sending an SRS may be {0, 1} or {2, 3}, or may be {0, 1}, {0, 2}, or {0, 3}. Specifically, an antenna pair may be determined by using a parameter $\Lambda=\{2 \text{ or } 3\}$. If $\Lambda=2$, an antenna pair used to simultaneously send an SRS is $\{2a(n_{SRS\_ant}), 2a(n_{SRS\_ant})+1\}$, and if $\Lambda=3$, an antenna pair used to simultaneously send an SRS is $\{0, a(n_{SRS\_ant})+1\}$.

2. When the antenna that is used to send the SRS in the first time unit and that corresponds to $n'_{SRS}$ is being determined, a determining manner is related to whether frequency hopping is performed. In this case, the terminal device may determine, based on the quantity of subbands occupied by the SRS in the frequency hopping process, $n'_{SRS}$, and $M_a$ if frequency hopping is configured for the SRS, the index of the antenna that is used to send the SRS in the first time unit and that corresponds to $n'_{SRS}$.

For example, when the terminal device has two antennas and sends the SRS by using one of the antennas at a same moment, or in other words, the terminal device is set to 1T2R, the index of the antenna that is used to send the SRS in the first time unit and that corresponds to $n'_{SRS}$ may satisfy the following formula:

$$a(n_{SRS\_ant}) = \begin{cases} \left(n_{SRS\_ant} + \left\lfloor \frac{n_{SRS\_ant}}{2} \right\rfloor + \beta \cdot \left\lfloor \frac{M_a \times n_{SRS\_ant}}{K} \right\rfloor\right) \bmod 2, & \text{when } \frac{K}{M_a} \text{ is an even integer} \\ n_{SRS\_ant} \bmod 2, & \text{other cases} \end{cases} \quad \text{(Formula 7)}$$

In formula 7, $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, K represents the quantity of subbands occupied by the SRS in the frequency hopping process, and $$\beta = \begin{cases} 1, & \text{when } \frac{K}{M_a} \bmod 4 = 0 \\ 0, & \text{other cases} \end{cases}$$

Alternatively, when the terminal device has four antennas and sends the SRS by using one of the antennas at a same moment, or in other words, the terminal device is set to 1T4R, the index of the antenna that is used to send the SRS in the first time unit and that corresponds to $n'_{SRS}$ may satisfy the following formula:

$$a(n_{SRS\_ant}) = \begin{cases} \left\{ \left[ n_{SRS\_ant} + \left\lfloor \dfrac{n_{SRS\_ant}}{\max\left(4, \dfrac{K}{M_a}\right)} \right\rfloor + \beta \left( \left\lfloor \dfrac{n_{SRS\_ant}}{4} \right\rfloor \bmod \left\lfloor \dfrac{\max\left(4, \dfrac{K}{M_a}\right)}{4} \right\rfloor \right) \right] \bmod 4 \right\}, & \text{when } \dfrac{K}{M_a} \text{ is an even integer} \\ n_{SRS\_ant} \bmod 4, & \text{other cases} \end{cases} \quad \text{(Formula 8)}$$

In formula 8, $a(n_{SRS\_ant})$ represents the index of the antenna that is used to send the SRS in the first time unit and that corresponds to $n'_{SRS}$, $n_{SRS\_ant} = \lfloor n'_{SRS}/M_a \rfloor$, K represents the quantity of subbands occupied by the SRS in the frequency hopping process, and $$\beta = \begin{cases} 1, & \text{if } N_1 = 2, N_2 = 2 \\ 0, & \text{other cases} \end{cases}.$$

N1 and N2 are quantities determined based on an SRS bandwidth configuration parameter $C_{SRS}$, and a correspondence between $C_{SRS}$, a quantity $m_{SRS,b}$ of resource blocks (resource block, RB) included in SRS bandwidth, and $N_b$ is shown in Table 1 to Table 4.

TABLE 1

Correspondence between $m_{SRS,b}$ and $N_b$ (b = 0, 1, 2, 3) when a quantity of uplink RBs satisfies $6 \leq N_{RB}^{UL} \leq 40$

| SRS bandwidth configuration parameter $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

Correspondence between $m_{SRS,b}$ and $N_b$ (b = 0, 1, 2, 3) when a quantity of uplink RBs satisfies $40 < N_{RB}^{UL} \leq 60$

| SRS bandwidth configuration parameter $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

Correspondence between $m_{SRS,b}$ and $N_b$ (b = 0, 1, 2, 3) when a quantity of uplink RBs satisfies $60 < N_{RB}^{UL} \leq 80$

| SRS bandwidth configuration parameter | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

Correspondence between $m_{SRS,b}$ and $N_b$ (b = 0, 1, 2, 3) when a quantity of uplink RBs satisfies $80 < N_{RB}^{UL} \leq 110$

| SRS bandwidth configuration parameter | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Alternatively, when the terminal device has four antennas and sends the SRS by using two of the antennas at a same moment, or in other words, the terminal device is set to 2T4R, the index of the antenna that is used to send the SRS in the first time unit and that corresponds to n'$_{SRS}$ may satisfy the following formula:

$$a(n_{SRS\_ant}) = \begin{cases} \left(n_{SRS\_ant} + \left\lfloor \frac{n_{SRS\_ant}}{\Lambda} \right\rfloor + \beta\left(\left\lfloor \frac{M_a \times n_{SRS\_ant}}{K} \right\rfloor\right)\right) \bmod \Lambda, & \text{when } \frac{K}{M_a} \text{ is an integer and } \frac{K}{M_a} \bmod \Lambda = 0 \\ n_{SRS\_ant} \bmod \Lambda, & \text{other cases} \end{cases}$$

(Formula 9)

In formula 9, a($n_{SRS\_ant}$) represents the index of the antenna that is used to send the SRS in the first time unit and that corresponds to n'$_{SRS}$, $n_{SRS\_ant} = \lfloor n'_{SRS}/M_a \rfloor$, K represents the quantity of subbands occupied by the SRS in the frequency hopping process, and $$\beta = \begin{cases} 1, & \text{if } \frac{K}{M_a} \bmod \Lambda^2 = 0 \\ 0, & \text{other cases} \end{cases}$$

3. When the antenna that is used to send the SRS in the first time unit and that corresponds to n'$_{SRS}$ is being determined, a determining manner is related to whether frequency hopping is performed. In this case, the terminal device may determine, based on the quantity of transmit antennas and the quantity of receive antennas that are corresponding to the terminal device, n'$_{SRS}$, and $M_a$ regardless of whether frequency hopping is configured for the SRS, the index of the antenna that is used to send the SRS in the first time unit and that corresponds to n'$_{SRS}$. If the technical solution provided in this embodiment of this application is applied to an LTE system, the antenna selection mode may enable the LTE system and an NR system to have a same antenna selection manner, thereby facilitating simultaneous transmission of an SRS in the LTE system and the NR system.

For example, when the terminal device has two antennas and sends the SRS by using one of the antennas at a same moment, or in other words, the terminal device is set to 1T2R, the index of the antenna that is used to send the SRS in the first time unit and that corresponds to n'$_{SRS}$ may satisfy the following formula:

$$a(n_{SRS\_ant}) = n_{SRS\_ant} \bmod 2$$ (Formula 10)

In formula 10, a($n_{SRS\_ant}$) represents the index of the antenna that is used to send the SRS in the first time unit and that corresponds to n'$_{SRS}$, and $n_{SRS\_ant} = \lfloor n'_{SRS}/M_a \rfloor$. It may be learned that formula 10 is the same as formula 4.

Alternatively, when the terminal device has four antennas and sends the SRS by using one of the antennas at a same moment, or in other words, the terminal device is set to 1T4R, the index of the antenna that is used to send the SRS in the first time unit and that corresponds to $n'_{SRS}$ may satisfy the following formula:

$$n_b = \begin{cases} \lfloor 4n_{RRC}/m_{SRS,b} \rfloor \bmod N_b, & \text{when } b \leq b_{hop} \\ \left(F_b(n_{SRS\_fh}) + \left\lfloor \frac{4n_{RRC}}{m_{SRS,b}} \right\rfloor\right) \bmod N_b, & \text{other cases} \end{cases} \quad \text{(Formula 13)}$$

and $$F_b(n'_{SRS}) = \begin{cases} \left(\frac{N_b}{2}\right)\left\lfloor \frac{n'_{SRS} \bmod \prod_{b'=b_{hop}}^{b} N_{b'}}{\prod_{b'=b_{hop}}^{b-1} N_{b'}} \right\rfloor + \left\lfloor \frac{n'_{SRS} \bmod \prod_{b'=b_{hop}}^{b} N_{b'}}{2\prod_{b'=b_{hop}}^{b-1} N_{b'}} \right\rfloor, & \text{when } N_b \text{ is an even number} \\ \lfloor N_b/2 \rfloor \left\lfloor n'_{SRS} / \prod_{b'=b_{hop}}^{b-1} N_{b'} \right\rfloor, & \text{when } N_b \text{ is an odd number} \end{cases} \quad \text{(Formula 14)}$$

$$a(n_{SRS\_ant})=n_{SRS\_ant} \bmod 4 \quad \text{(Formula 11)}$$

In formula 11, $a(n_{SRS\_ant})$ represents the index of the antenna that is used to send the SRS in the first time unit and that corresponds to $n'_{SRS}$, and $n_{SRS\_ant}=\lfloor n'_{SRS}/M_a \rfloor$. It may be learned that formula 11 is the same as formula 5.

Alternatively, when the terminal device has four antennas and sends the SRS by using two of the antennas at a same moment, or in other words, the terminal device is set to 2T4R, the index of the antenna that is used to send the SRS in the first time unit and that corresponds to $n'_{SRS}$ may satisfy the following formula:

$$a(n_{SRS\_ant})=n_{SRS\_ant} \bmod \Lambda \quad \text{(Formula 12)}$$

In formula 12, $a(n_{SRS\_ant})$ represents the index of the antenna that is used to send the SRS in the first time unit and that corresponds to $n'_{SRS}$, $n_{SRS\_ant}=\lfloor n'_{SRS}/M_a \rfloor$, and $\Lambda$ is 2 or 3. It may be learned that formula 12 is the same as formula 6.

The foregoing describes how the terminal device determines the antenna that is used to send the SRS in the first time unit and that corresponds to $n'_{SRS}$. In addition, the foregoing also describes a case in which the terminal device may further perform frequency hopping when sending the SRS. In this case, if the terminal device needs to send the SRS, a position of a subband used to send the SRS needs to be further determined. For example, the terminal device may determine, based on $n'_{SRS}$, the subband used to send the SRS.

In an implementation, if whether frequency hopping is performed in the process of sending the SRS by the terminal device is related when the terminal device determines the index of the antenna that is used to send the SRS in the first time unit and that corresponds to $n'_{SRS}$, or in other words, if the terminal device determines, by using the foregoing second item, the index of the antenna that is used to send the SRS in the first time unit and that corresponds to $n'_{SRS}$, the index of the subband used to send the SRS may satisfy the following formulas:

$b_{hop}$ is determined based on SRS-hopping bandwidth (srs-HoppingBandwidth) delivered by the network device, $b_{hop} \in \{0, 1, 2, 3\}$, $n_{RRC}$ is determined based on a periodic SRS frequency domain position (freqDomainPosition) or an aperiodic SRS frequency domain position (freqDomainPosition-ap) delivered by the network device, $B_{SRS}$, $N_b$, $N_{b'}$, and $M_{SRS,b}$ are determined based on an SRS-bandwidth configuration (srs-BandwidthConfig) delivered by the network device, and $N_{ant}$ represents a quantity of antennas in the terminal device.

Alternatively, in another implementation, whether the terminal device performs frequency hopping in the process of sending the SRS is not related when the terminal device determines the index of the antenna that is used to send the SRS in the first time unit and that corresponds to $n'_{SRS}$, or in other words, if the terminal device determines, by using the foregoing third item, the index of the antenna that is used to send the SRS in the first time unit and that corresponds to $n'_{SRS}$, the index of the subband used to send the SRS may satisfy the following formulas:

$$n_b = \begin{cases} \lfloor 4n_{RRC}/m_{SRS,b} \rfloor \bmod N_b, & \text{when } b \leq b_{hop} \\ \left(F_b(n_{SRS\_fh}) + \left\lfloor \frac{4n_{RRC}}{m_{SRS,b}} \right\rfloor\right) \bmod N_b, & \text{other cases} \end{cases} \quad \text{(Formula 15)}$$

and $$F_b(n_{SRS_{fh}}) = \begin{cases} \left(\frac{N_b}{2}\right)\left\lfloor \frac{n_{SRS\_fh} \bmod \prod_{b'=b_{hop}}^{b} N_{b'}}{\prod_{b'=b_{hop}}^{b-1} N_{b'}} \right\rfloor + \left\lfloor \frac{n_{SRS\_fh} \bmod \prod_{b'=b_{hop}}^{b} N_{b'}}{2\prod_{b'=b_{hop}}^{b-1} N_{b'}} \right\rfloor, & \text{when } N_b \text{ is an even number} \\ \lfloor N_b/2 \rfloor \left\lfloor n_{SRS\_fh} / \prod_{b'=b_{hop}}^{b-1} N_{b'} \right\rfloor, & \text{when } N_b \text{ is an odd number} \end{cases} \quad \text{(Formula 16)}$$

where $$n_{SRS\_fh} = \left\lfloor \frac{n'_{SRS}}{M_a N_{ant}} \right\rfloor \times M_a + n'_{SRS} \bmod M_a.$$

As described above, if whether terminal device performs frequency hopping in the process of sending the SRS is not related when the terminal device determines the index of the antenna that is used to send the SRS in the first time unit and that corresponds to $n'_{SRS}$, the antenna selection mode may enable the LTE system and the NR system to have a same antenna selection manner, thereby facilitating simultaneous transmission of an SRS in the LTE system and the NR system. In this case, the LTE system and the NR system can also have a same frequency hopping manner by using formula 15 to determine the subband used to send the SRS.

S44. The terminal device sends the SRS by using the antenna in the first time unit indicated by $n'_{SRS}$, and the network device receives the SRS from the terminal device in the first time unit indicated by $n'_{SRS}$.

The network device may also determine, in a manner the same as that of the terminal device, the antenna used to send the SRS, the position of the subband used to send the SRS, and the like. Details are not described again.

In this embodiment of this application, the terminal device may determine, based on the quantity $M_{SRS}$ of first time units that are used by the terminal device to send the SRS in one subframe, the first index $n'_{SRS}$ of the first time unit used to send the SRS, and then determine, based on $n'_{SRS}$ and the quantity $M_a$ of first time units that are consecutively used to send the SRS in one subframe by using a same antenna, the antenna that is used to send the SRS in the first time unit and that corresponds to $n'_{SRS}$. Therefore, a case in which one subframe includes a plurality of first time units is considered by using $M_{SRS}$ and a case in which one antenna is enabled to implement continuous sending as much as possible is also considered by using $M_a$. It may be learned that in the technical solution provided in this embodiment of this application, a manner of determining an antenna for sending an SRS is provided, and a same antenna can be enabled to implement continuous sending as much as possible. For example, a quantity of antenna switching times can be reduced in one subframe, or no antenna switching may be performed in one subframe, so that service continuity can be ensured as much as possible and power consumption caused by antenna switching of the terminal device can be reduced.

Figure 7:
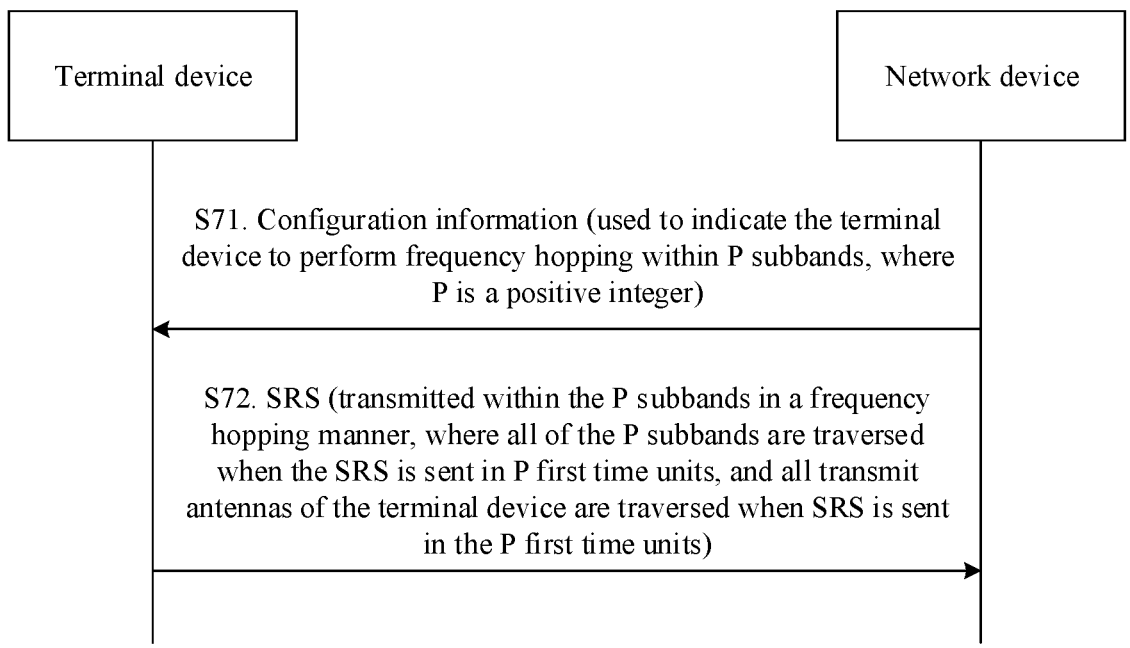
FIG. 7 is a flowchart of a second SRS sending and receiving method according to an embodiment of this application.

To resolve the same technical problem, the following further provides a second SRS sending and receiving method. FIG. 7 is a flowchart of the method. In the following description process, for example, the method is applied to the network architecture shown in FIG. 3. In addition, the method may be performed by two communications apparatuses. The two communications apparatuses are, for example, a third communications apparatus and a fourth communications apparatus. The third communications apparatus may be a network device or a communications apparatus that can support a network device in implementing a function required by the method, or the third communications apparatus may be a terminal device or a communications apparatus that can support a terminal device in implementing a function required by the method. Certainly, the third communications apparatus may be another communications apparatus, for example, a chip system. The same is true for the fourth communications apparatus. The fourth communications apparatus may be a network device or a communications apparatus that can support a network device in implementing a function required by the method, or the fourth communications apparatus may be a terminal device or a communications apparatus that can support a terminal device in implementing a function required by the method. Certainly, the fourth communications apparatus may be another communications apparatus, for example, a chip system. In addition, implementations of the third communications apparatus and the fourth communications apparatus are not limited. For example, the third communications apparatus may be a network device, and the fourth communications apparatus is a terminal device, or both the third communications apparatus and the fourth communications apparatus are network devices, or both the third communications apparatus and the fourth communications apparatus are terminal devices, or the third communications apparatus is a network device, and the fourth communications apparatus is a communications apparatus that can support a terminal device in implementing a function required by the method. The network device is, for example, a base station.

For ease of description, the following uses an example in which the method is performed by a network device and a terminal device, that is, an example in which the third communications apparatus is a network device and the fourth communications apparatus is a terminal device. Because an example in which this embodiment is applied to the network architecture shown in FIG. 3 is used, the network device described below may be a network device in the network architecture shown in FIG. 3, and the terminal device described below may be a terminal device in the network architecture shown in FIG. 3.

S71. A network device sends configuration information to a terminal device, and the terminal device receives the configuration information from the network device, where the configuration information is used to indicate the terminal device to perform frequency hopping within P subbands, and P is a positive integer.

S72. The terminal device sends an SRS to the network device within the P subbands in a frequency hopping manner, and the network device receives the SRS from the terminal device within the P subbands, where the terminal device traverses all of the P subbands when sending the SRS in P first time units, and the terminal device traverses all transmit antennas of the terminal device when sending the SRS in the P first time units.

The first time unit may be one symbol or H consecutive symbols, and H is an integer greater than or equal to 2. For example, the first time unit is one symbol. A plurality of symbols may be used to send the SRS in one subframe, and may be predefined in a protocol. However, for different terminal devices, a quantity of symbols used to send the SRS in one subframe may be configured by the network device. For example, the protocol specifies that four symbols may be used to send the SRS in one subframe. In this case, a quantity, configured by the network device for each terminal device, of symbols that can be used to send the SRS in one subframe may be less than or equal to 4. For example, for the terminal device, the network device may determine a quantity of first time units that are used by the terminal device to send the SRS in one subframe, and notify the terminal device of the quantity by using the configuration information. Therefore, after receiving the configuration information, the terminal device may determine the quantity of first time units that may be used to send the SRS in one subframe.

The terminal device may determine, in the following manner, an index of an antenna used to send the SRS in the P first time units:

When the terminal device has two antennas and sends the SRS by using one of the antennas at a same moment, or in other words, the terminal device is set to 1T2R, the index of the antenna used to send the SRS in the P first time units may satisfy the following formula:

$$a(n_{SRS\_ant}) = n_{SRS\_ant} \bmod 2 \qquad \text{(Formula 17)}$$

In formula 17, $a(n_{SRS\_ant})$ represents the index of the antenna used to send the SRS, and $n_{SRS\_ant} = \lfloor n'_{SRS}/M_a \rfloor$.

Alternatively, when the terminal device has four antennas and sends the SRS by using one of the antennas at a same moment, or in other words, the terminal device is set to 1T4R, the index of the antenna used to send the SRS in the P first time units may satisfy the following formula:

$$a(n_{SRS\_ant}) = n_{SRS\_ant} \bmod 4 \quad \text{(Formula 18)}$$

In formula 18, $a(n_{SRS\_ant})$ represents the index of the antenna used to send the SRS, and $n_{SRS\_ant} = \lfloor n'_{SRS}/M_a \rfloor$.

Alternatively, when the terminal device has four antennas and sends the SRS by using two of the antennas at a same moment, or in other words, the terminal device is set to 2T4R, the index of the antenna used to send the SRS in the P first time units may satisfy the following formula:

$$a(n_{SRS\_ant}) = n_{SRS\_ant} \bmod \Lambda \quad \text{(Formula 19)}$$

In formula 19, $a(n_{SRS\_ant})$ represents the index of the antenna used to send the SRS, $n_{SRS\_ant} = \lfloor n'_{SRS}/M_a \rfloor$, and $\Lambda$ is 2 or 3.

In formula 17 to formula 19, $M_a$ is a quantity of first time units that are consecutively used to send the SRS in one subframe by using a same antenna, and $n'_{SRS}$ is a first index of a first time unit used to send the SRS. For descriptions of parameters such as $M_a$, $\Lambda$, and $n'_{SRS}$, refer to the embodiment shown in FIG. 4.

$n'_{SRS}$ is involved in formula 17 to formula 19. In an implementation, $n'_{SRS}$ may satisfy the following formula:

$$n'_{SRS} = \begin{cases} \left( \left(2N_{SP}n_f + 2(N_{SP}-1)\left\lfloor \frac{n_s}{10} \right\rfloor + \left\lfloor \frac{T_{offset}}{T_{offset\_max}} \right\rfloor \right) \times M_{SRS} + m, & \text{frame structure type 2 with an SRS periodicity of} \\ \left\lfloor n_f \times 10 + \left\lfloor \frac{n_s}{2} \right\rfloor / T_{SRS} \right\rfloor \times M_{SRS} + m, & \text{other cases} \end{cases} \quad \text{(Formula 20)}$$

$T_{SRS}$ represents an SRS transmission periodicity configured by the network device for the terminal device, $T_{offset}$ represents a position of a subframe that is used to send the SRS in the periodicity $T_{SRS}$ configured by the network device for the terminal device, $N_{SP}$ represents a quantity of downlink-to-uplink switching points in a radio frame in which the SRS is located, $n_f$ represents a frame number of the radio frame in which the SRS is located, $n_s$ represents a slot number in the radio frame in which the SRS is located, $n_s$ is =0, 1, . . . , 19, $M_{SRS}$ represents a quantity of first time units that are allocated to the terminal device to transmit the SRS in one subframe, m represents a first index of a first time unit that is allocated to the terminal device to transmit the SRS in one subframe, and m=0, 1, . . . , $M_{SRS}-1$.

Certainly, a manner of determining $n'_{SRS}$ is not limited in this embodiment of this application. The terminal device may determine $n'_{SRS}$ in another manner, provided that the quantity of first time units that are allocated to the terminal device to transmit the SRS in one subframe is considered during the determining of $n'_{SRS}$.

In addition, for parameters not described in detail in the embodiment shown in FIG. 7, refer to the related descriptions in the embodiment shown in FIG. 4.

It may be learned that formula 17 is the same as formula 12, formula 18 is the same as formula 13, and formula 19 is the same as formula 14. In addition, whether the terminal device performs frequency hopping in a process of sending the SRS is not related when the terminal device determines the antenna used to send the SRS. Therefore, it may be considered that in this embodiment of this application, the terminal device determines the antenna in the third antenna determining manner described in the embodiment shown in FIG. 4.

The terminal device traverses all of the P subbands when sending the SRS in the P first time units, and the terminal device traverses all the transmit antennas of the terminal device when sending the SRS in the P first time units. In other words, the terminal device uses all the transmit antennas of the terminal device when sending the SRS in the P first time units, and traverses all of the P subbands when sending the SRS in the P first time units. In this manner, the network device can obtain channel information of all uplink subbands in a relatively short time. For example, the terminal device has two transmit antennas, P=4, and the terminal device sends the SRS in one subframe by using four symbols. For example, the terminal device sends the SRS on a subband 1 on the first symbol by using an antenna 0, sends the SRS on a subband 3 on the second symbol by using the antenna 0, sends the SRS on a subband 2 on the third symbol by using an antenna 1, and sends the SRS on a subband 4 on the fourth symbol by using the antenna 1. It may be learned that, the terminal device uses all the transmit antennas of the terminal device and traverse all the subbands in the process of sending the SRS. Certainly, an example in which the P first time units belong to one subframe is merely used. In actual application, a quantity of subframes to which the P first time units belong is not limited. For example, the P first time units may belong to one subframe or a plurality of subframes.

The embodiment shown in FIG. 7 may be further understood based on the following process.

The terminal device may first determine, based on a quantity $M_{SRS}$ of first time units used to transmit the SRS in one subframe, a first index $n'_{SRS}$ of a first time unit used to send the SRS. For a manner of determining $n'_{SRS}$, refer to formula 20. After $n'_{SRS}$ is determined, a new first index of a first time unit used to send the SRS may be determined based on $n'_{SRS}$ and a first formula. The determined new first index satisfies that a virtual corresponding antenna determined based on the first formula and a new index corresponding to $n'_{SRS}+1$ and a virtual corresponding antenna determined based on the first formula and a new index corresponding to $n'_{SRS}$ are a same antenna; or a virtual corresponding antenna determined based on the first formula and a new index corresponding to $n'_{SRS}-1$ and a virtual corresponding antenna determined based on the first formula and $n'_{SRS}$ are a same antenna. In other words, the determined new first index satisfies that the SRS is sent by using a same antenna in at least two consecutive first time units. The "virtual corresponding antenna" herein is actually a determined antenna. However, because the terminal device does not use the determined antenna when actually sending the SRS, the determined antenna is referred to as the "virtual corresponding antenna". In other words, an antenna actually used by the terminal device to send the SRS is determined based on formula 17 to formula 19, and the "virtual corresponding antenna" herein is apparently not the foregoing antenna determined based on formula 17 to formula 19. Specifically, the terminal device may determine, based on $n'_{SRS}$ and the first formula, a virtual corresponding antenna of each first time unit that is used to send the SRS in one second time unit and on which the SRS is sent, and then obtain, based on the virtual corresponding antenna of each first time unit that is used to transmit the SRS and on which the SRS is transmitted, a new index of the first time unit used to send the SRS.

For example, the first formula includes the following.

(1) When the terminal device has four antennas and sends the SRS by using one of the antennas at a same moment, or in other words, when the terminal device is set to 1T4R:

if no frequency hopping is configured for the SRS, an index of a virtual corresponding antenna used to send the SRS in a first time unit may satisfy the following formula:

$$a(n'_{SRS}) = n'_{SRS} \bmod 4 \quad \text{(Formula 21)},$$

where in formula 21, $a(n'_{SRS})$ represents the index of the virtual corresponding antenna used to send the SRS; or if frequency hopping is configured for the SRS, an index of a virtual corresponding antenna used to send the SRS in a first time unit may satisfy the following formula:

$$a(n'_{SRS}) = \begin{cases} \left(n'_{SRS} + \left\lfloor \frac{n'_{SRS}}{\max(4,K)} \right\rfloor + \beta \left(\left\lfloor \frac{n'_{SRS}}{4} \right\rfloor \bmod \left\lfloor \frac{\max(4,K)}{4} \right\rfloor \right)\right) \bmod 4, & \text{when } K \text{ is an even integer} \\ n'_{SRS} \bmod 4, & \text{other cases} \end{cases} \quad \text{(Formula 22)}$$

where in formula 22, $a(n'_{SRS})$ represents the index of the virtual corresponding antenna used to send the SRS, K represents a quantity of subbands occupied by the SRS in a frequency hopping process, and $$\beta = \begin{cases} 1, & \text{if } N_1 = 2, N_2 = 2 \\ 0, & \text{other cases} \end{cases}.$$

(2) When the terminal device has four antennas and sends the SRS by using two of the antennas at a same moment, or in other words, when the terminal device is set to 2T4R:

if no frequency hopping is configured for the SRS, an index of a virtual corresponding antenna used to send the SRS in a first time unit satisfies the following formula:

$$a(n'_{SRS}) = n'_{SRS} \bmod \Lambda \quad \text{(Formula 22)},$$

where in formula 22, $a(n'_{SRS})$ represents the index of the virtual corresponding antenna used to send the SRS, and $\Lambda$ is 2 or 3; or if frequency hopping is configured for the SRS, an index of a virtual corresponding antenna used to send the SRS in a first time unit may satisfy the following formula:

$$a(n'_{SRS}) = \begin{cases} \left(n'_{SRS} + \left\lfloor \frac{n'_{SRS}}{\Lambda} \right\rfloor + \beta\left(\left\lfloor \frac{n'_{SRS}}{K} \right\rfloor\right)\right) \bmod \Lambda, & \text{when } K \bmod \Lambda = 0 \\ n'_{SRS} \bmod \Lambda, & \text{other cases} \end{cases}, \quad \text{Formula (23)}$$

where in formula 23, $a(n'_{SRS})$ represents the index of the virtual corresponding antenna used to send the SRS, K represents a quantity of subbands occupied by the SRS in a frequency hopping process, and $$\beta = \begin{cases} 1, & \text{if } K \bmod \Lambda^2 = 0 \\ 0, & \text{other cases} \end{cases}.$$

(3) When the terminal device has two antennas and sends the SRS by using two of the antennas at a same moment, or in other words, when the terminal device is set to 1T2R:

if no frequency hopping is configured for the SRS, an index of a virtual corresponding antenna used to send the SRS in a first time unit may satisfy the following formula:

$$a(n'_{SRS}) = n'_{SRS} \bmod 2 \quad \text{(Formula 24)},$$

where in formula 24, $a(n'_{SRS})$ represents the index of the virtual corresponding antenna used to send the SRS; or if frequency hopping is configured for the SRS, an index of a virtual corresponding antenna used to send the SRS in a first time unit may satisfy the following formula:

$$a(n'_{SRS}) = \begin{cases} \left(n'_{SRS} + \left\lfloor \frac{n'_{SRS}}{2} \right\rfloor + \beta \cdot \left(\left\lfloor \frac{n'_{SRS}}{K} \right\rfloor\right)\right) \bmod 2, & \text{when } K \text{ is an even integer} \\ n'_{SRS} \bmod 2, & \text{other cases} \end{cases}, \quad \text{(Formula 25)}$$

where in formula 25, $a(n'_{SRS})$ represents the index of the virtual corresponding antenna used to send the SRS, K represents a quantity of subbands occupied by the SRS in a frequency hopping process, and $$\beta = \begin{cases} 1, & \text{when } K \bmod 4 = 0 \\ 0, & \text{other cases} \end{cases}.$$

After determining the new first index of the first time unit used to send the SRS, the terminal device may determine, based on the new first index of the first time unit used to send the SRS, a subband used to send the SRS.

For example, the subband used to send the SRS may satisfy the following formula:

$$n_b = \begin{cases} \lfloor 4n_{RRC}/m_{SRS,b} \rfloor \bmod N_b, & \text{when } b \leq b_{hop} \\ \left(F_b(n_{SRS\_new}) + \lfloor \frac{4n_{RRC}}{m_{SRS,b}} \rfloor\right) \bmod N_b, & \text{other cases} \end{cases} \quad \text{(Formula 26)}$$

In formula 26, $n_{SRS\_new}$ represents the new first index of the first time unit used to send the SRS, $N_{ant}$ represents a quantity of antennas in the terminal device, and $$F_b(n_{SRS\_new}) = \begin{cases} \left(\frac{N_b}{2}\right) \left\lfloor \frac{n_{SRS\_new} \bmod \prod_{b'=b_{hop}}^{b} N_{b'}}{\prod_{b'=b_{hop}}^{b-1} N_{b'}} \right\rfloor + \left\lfloor \frac{n_{SRS\_fh} \bmod \prod_{b'=b_{hop}}^{b} N_{b'}}{2\prod_{b'=b_{hop}}^{b-1} N_{b'}} \right\rfloor, & \text{when } N_b \text{ is an even number} \\ \lfloor N_b/2 \rfloor \left\lfloor n_{SRS\_new} / \prod_{b'=b_{hop}}^{b-1} N_{b'} \right\rfloor, & \text{when } N_b \text{ is an odd number} \end{cases}$$

Figure 8:
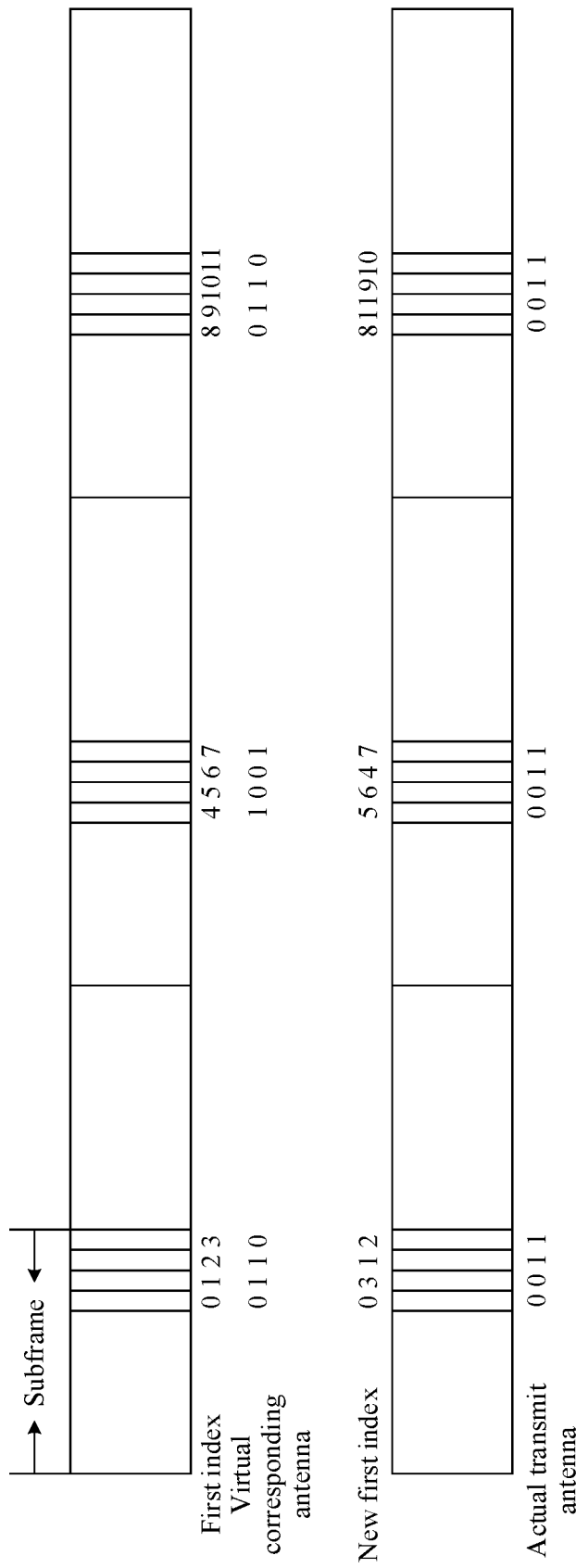
FIG. 8 is a schematic diagram in which a terminal device determines a new first index and an antenna used to send an SRS according to an embodiment of this application.
Figure 9:
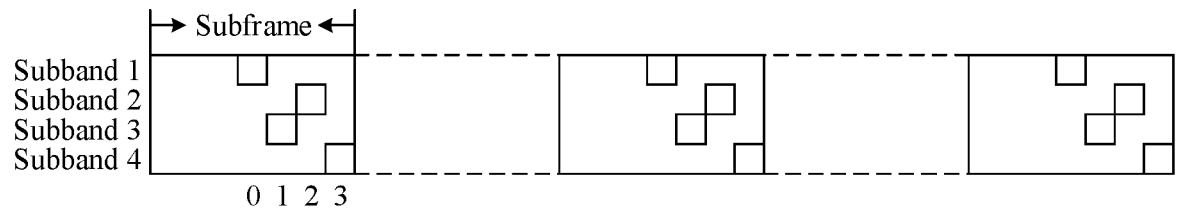
FIG. 9 is a schematic diagram in which a terminal device traverses all subbands and all antennas when sending an SRS in P first time units according to an embodiment of this application.

Therefore, the terminal device may send the SRS in the first time unit indicated by $n'_{SRS}$ and on the subband used to send the SRS by using the antenna determined based on formula 17 to formula 19. For example, the first time unit is one symbol. Referring to FIG. 8, the terminal device first determines, based on a quantity $M_{SRS}$ of symbols used to transmit the SRS in one subframe, a first index $n'_{SRS}$ of a symbol used to send the SRS. FIG. 8 shows three subframes. For example, first indexes $n'_{SRS}$ that are of symbols used to send the SRS and that are determined by the terminal device include 0 to 3 in the first subframe, include 4 to 7 in the second subframe, and include 8 to 11 in the third subframe. After $n'_{SRS}$ is determined, a virtual corresponding antenna of each symbol that is used to send the SRS in one subframe and on which the SRS is sent may be determined based on $n'_{SRS}$ and the first formula. For example, the terminal device determines that a virtual corresponding antenna of a symbol 0 included in the first subframe is an antenna 0, a virtual corresponding antenna of a symbol 1 included in the first subframe is an antenna 1, a virtual corresponding antenna of a symbol 2 included in the first subframe is an antenna 1, and a virtual corresponding antenna of a symbol 3 included in the first subframe is an antenna 0. For cases in the second subframe and the third subframe, refer to FIG. 8. Details are not described herein. It may be learned that, taking the first subframe as an example, two symbols corresponding to the antenna 1 are consecutive, but two symbols corresponding to the antenna 0 are not consecutive. In this case, it may be considered that the two symbols corresponding to the antenna 0 are changed into consecutive, or in other words, a symbol corresponding to the antenna 0 may be changed. For example, the symbol 3 corresponding to the antenna 0 may be changed to the symbol 1. In this case, a symbol corresponding to an antenna 2 is also changed. For example, a symbol 1 and a symbol 2 corresponding to the antenna 2 are changed to a symbol 2 and a symbol 3. In this way, a new first index of a symbol used to send the SRS is obtained. For example, for the first subframe, new first indexes of symbols used to send the SRS are 0, 3, 1, and 2. Therefore, the terminal device may determine, based on the new first index used to send the SRS and formula 26, the subband used to send the SRS. For example, FIG. 9 is a schematic diagram of a subband used by the terminal device to send an SRS. A vertical axis represents frequency domain, and a horizontal axis represents time domain. FIG. 9 also shows three subframes. It may be considered that FIG. 9 uses an example in which P=4 and a total quantity of uplink subbands of the terminal device is also equal to 4. When the terminal device sends the SRS in the three subframes, a same frequency hopping manner is used. Taking the first subframe as an example, the terminal device sends the SRS on a subband 1 by using an antenna 0 on a symbol 0, sends the SRS on a subband 3 by using the antenna 0 on a symbol 1, sends the SRS on a subband 2 by using an antenna 1 on a symbol 2, and sends the SRS on a subband 4 by using the antenna 1 on a symbol 3. It may be learned that, the terminal device uses all transmit antennas of the terminal device on P symbols and traverses all subbands in the process of sending the SRS, so that the network device can obtain channel information of all uplink subbands.

Certainly, the foregoing determined virtual corresponding antenna is not an antenna actually used by the terminal device to send the SRS. Therefore, the terminal device may further determine, based on formula 17 to formula 19, the antenna used to send the SRS. For an index of the antenna used to send the SRS, refer to the example in FIG. 8. Taking the first subframe as an example, an antenna corresponding to the symbol 0 and the symbol 1 is the antenna 0, and an index of an antenna corresponding to the symbol 2 and the symbol 3 is the antenna 1. The terminal device may send the SRS after determining the antenna and the subband.

Certainly, the network device may determine, in a manner the same as that of the terminal device, the subband used to send the SRS, and determine the antenna actually used to send the SRS. Details are not described again.

It may be learned that, according to the technical solution in this embodiment of this application, the network device can obtain channel information of all uplink subbands in a relatively short time, so that the network device can perform relatively proper scheduling on the terminal device. In addition, in this embodiment of this application, when an antenna used to send the SRS is being determined, a case in which one subframe includes a plurality of first time units is considered and a case in which one antenna is enabled to implement continuous sending as much as possible is also considered by using $M_a$, so that a quantity of antenna switching times can be reduced in one subframe, or no antenna switching may be performed in one subframe, to ensure service continuity as much as possible and reduce power consumption caused by antenna switching of the terminal device.

The following describes, with reference to the accompanying drawings, apparatuses configured to implement the foregoing method in the embodiments of this application. Therefore, all the foregoing content may be used in subsequent embodiments, and repeated content is not described again.

Figure 10:
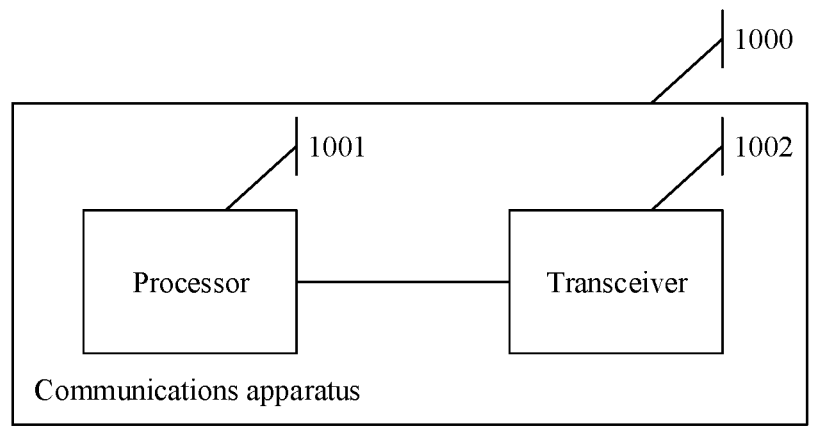
FIG. 10 is a schematic diagram of a communications apparatus that can implement a function of a terminal device according to an embodiment of this application.

FIG. 10 is a schematic structural diagram of a terminal device 1000. The terminal device 1000 may implement a function of the terminal device described above. The terminal device 1000 may be an independent device that can implement a function of the foregoing terminal device, or may be a chip disposed in a device that can implement a function of the foregoing terminal device. The terminal device 1000 may include a processor 1001 and a transceiver 1002. If the terminal device 1000 is the independent device, the transceiver 1002 may be a radio frequency transceiver component in the device. Alternatively, if the terminal device 1000 is the chip disposed in the device, the transceiver 1002 may be a communications interface in the chip, and the communications interface may be connected to the radio frequency transceiver component in the device in which the chip is located, to implement signal receiving and sending by using the radio frequency transceiver component. The processor 1001 may be configured to perform S42 and S43 in the embodiment shown in FIG. 4, and/or configured to support another process of the technology described in this specification. The transceiver 1002 may be configured to perform S41 and S44 in the embodiment shown in FIG. 4, and/or configured to support another process of the technology described in this specification.

For example, the transceiver 1002 is configured to receive configuration information from a network device, where the configuration information is used to indicate a quantity $M_{SRS}$ of first time units that are used by the terminal device to send an SRS in one subframe, and the subframe includes a plurality of first time units.

The processor 1001 is configured to determine, based on $M_{SRS}$, a first index $n'_{SRS}$ of a first time unit used to send the SRS.

The processor 1001 is further configured to determine, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The transceiver 1002 is further configured to send, by using the antenna, the SRS in the first time unit indicated by $n'_{SRS}$.

All related content of the steps in the foregoing method embodiments may be cited in function descriptions of the corresponding function modules. Details are not described herein again.

Figure 11:
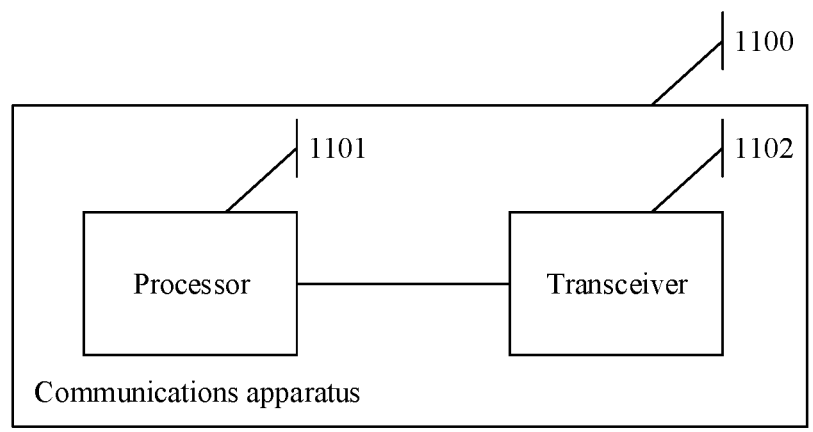
FIG. 11 is a schematic diagram of a communications apparatus that can implement a function of a network device according to an embodiment of this application.

FIG. 11 is a schematic structural diagram of a network device 1100. The network device 1100 may implement a function of the network device described above. The network device 1100 may be an independent device that can implement a function of the foregoing network device, or may be a chip disposed in a device that can implement a function of the foregoing network device. The network device 1100 may include a processor 1101 and a transceiver 1102. If the network device 1100 is the independent device, the transceiver 1102 may be a radio frequency transceiver component in the device. Alternatively, if the network device 1100 is the chip disposed in the device, the transceiver 1102 may be a communications interface in the chip, and the communications interface may be connected to the radio frequency transceiver component in the device in which the chip is located, to implement signal receiving and sending by using the radio frequency transceiver component. The processor 1101 may be configured to: generate configuration information in the embodiment shown in FIG. 4, determine, based on $M_{SRS}$, a first index $n'_{SRS}$ of a first time unit used to send an SRS, and determine, based on $n'_{SRS}$ and $M_a$, an antenna that is used to send the SRS in a first time unit and that corresponds to $n'_{SRS}$. $M_a$ is a process such as a quantity of first time units that are consecutively used to send the SRS in one subframe by using a same antenna, and/or configured to support another process of the technology described in this specification. The transceiver 1102 may be configured to perform S41 and S44 in the embodiment shown in FIG. 4, and/or configured to support another process of the technology described in this specification.

For example, the transceiver 1102 is configured to send configuration information to a terminal device, where the configuration information is used to indicate a quantity $M_{SRS}$ of first time units that are used by the terminal device to send an SRS in one subframe, and the subframe includes a plurality of first time units.

The processor 1101 is configured to determine, based on $M_{SRS}$, a first index $n'_{SRS}$ of a first time unit used to send the SRS.

The processor 1101 is further configured to determine, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The transceiver 1102 is further configured to receive, by using the antenna, the SRS in the first time unit indicated by $n'_{SRS}$.

All related content of the steps in the foregoing method embodiments may be cited in function descriptions of the corresponding function modules. Details are not described herein again.

Figure 12:
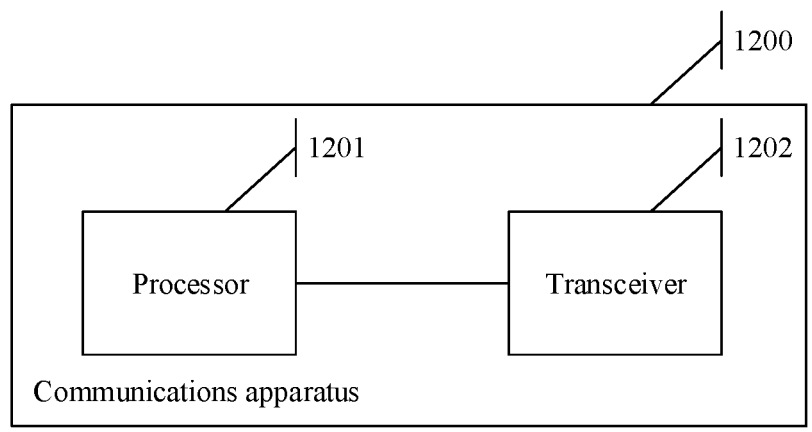
FIG. 12 is a schematic diagram of another communications apparatus that can implement a function of a terminal device according to an embodiment of this application.

FIG. 12 is a schematic structural diagram of a terminal device 1200. The terminal device 1200 may implement a function of the terminal device described above. The terminal device 1200 may be an independent device that can implement a function of the foregoing terminal device, or may be a chip disposed in a device that can implement a function of the foregoing terminal device. The terminal device 1200 may include a processor 1201 and a transceiver 1202. If the terminal device 1200 is the independent device, the transceiver 1202 may be a radio frequency transceiver component in the device. Alternatively, if the terminal device 1200 is the chip disposed in the device, the transceiver 1202 may be a communications interface in the chip, and the communications interface may be connected to the radio frequency transceiver component in the device in which the chip is located, to implement signal receiving and sending by using the radio frequency transceiver component. The processor 1201 may be configured to perform a process such as determining an antenna and a subband used to send an SRS in the embodiment shown in FIG. 7, and/or configured to support another process of the technology described in this specification. The transceiver 1202 may be configured to perform S71 and S72 in the embodiment shown in FIG. 7, and/or configured to support another process of the technology described in this specification.

For example, the transceiver 1202 is configured to receive configuration information from a network device, where the configuration information is used to indicate the terminal device 1200 to perform frequency hopping within P subbands, and P is a positive integer.

The transceiver 1202 is further configured to send an SRS to the network device in a frequency hopping manner within the P subbands, where the terminal device traverses all of the P subbands when sending the SRS in P first time units, and the terminal device 1200 traverses all transmit antennas of the terminal device 1200 when sending the SRS in the P first time units; and the processor 1201 determines, based on the following formula, an index of an antenna used to send the SRS in the P first time units, where when the terminal device 1200 has two antennas and sends the SRS by using one of the antennas at a same moment, the index of the antenna used to send the SRS in the P first time units satisfies the following formula: $a(n_{SRS\_ant}) = n_{SRS\_ant} \bmod 2$, where $a(n_{SRS\_ant})$ represents the index of the antenna used to send the SRS, $n_{SRS\_ant}=\lfloor n'_{SRS}/M_a \rfloor$, and mod represents a modulo operation; or when the terminal device 1200 has four antennas and sends the SRS by using one of the antennas at a same moment, the index of the antenna used to send the SRS in the P first time units satisfies the following formula: $a(n_{SRS\_ant})=n_{SRS\_ant}$ mod 4, where $a(n_{SRS\_ant})$ represents the index of the antenna used to send the SRS, $n_{SRS\_ant}=\lfloor n'_{SRS}/M_a \rfloor$, and mod represents a modulo operation; or when the terminal device 1200 has four antennas and sends the SRS by using two of the antennas at a same moment, the index of the antenna used to send the SRS in the P first time units satisfies the following formula: $a(n_{SRS\_ant})=n_{SRS\_ant}$ mod $\Lambda$, where $a(n_{SRS\_ant})$ represents the index of the antenna used to send the SRS, $n_{SRS\_ant} \lfloor n'_{SRS}/M_a \rfloor$, and mod represents a modulo operation, and $\Lambda$ is 2 or 3, where $M_a$ is a quantity of first time units that are consecutively used to send the SRS in one subframe by using a same antenna, and $n'_{SRS}$ is a first index of a first time unit used to send the SRS.

All related content of the steps in the foregoing method embodiments may be cited in function descriptions of the corresponding function modules. Details are not described herein again.

The terminal device 1200 shown in FIG. 12 and the terminal device 1000 shown in FIG. 10 may be a same communications apparatus, or may be different communications apparatuses.

Figure 13:
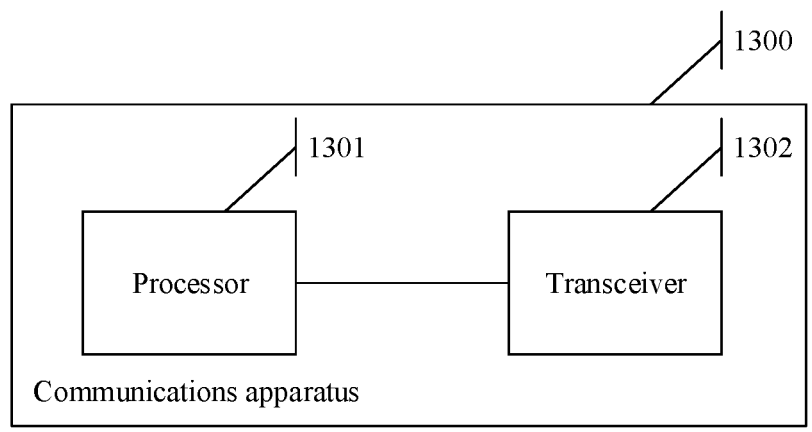
FIG. 13 is a schematic diagram of another communications apparatus that can implement a function of a network device according to an embodiment of this application.

FIG. 13 is a schematic structural diagram of a network device 1300. The network device 1300 may implement a function of the network device described above. The network device 1300 may be an independent device that can implement a function of the foregoing network device, or may be a chip disposed in a device that can implement a function of the foregoing network device. The network device 1300 may include a processor 1301 and a transceiver 1302. If the network device 1300 is the independent device, the transceiver 1302 may be a radio frequency transceiver component in the device. Alternatively, if the network device 1300 is the chip disposed in the device, the transceiver 1302 may be a communications interface in the chip, and the communications interface may be connected to the radio frequency transceiver component in the device in which the chip is located, to implement signal receiving and sending by using the radio frequency transceiver component. The processor 1301 may be configured to perform a process such as determining an antenna and a subband used to send an SRS in the embodiment shown in FIG. 7, and/or configured to support another process of the technology described in this specification. The transceiver 1302 may be configured to perform S71 and S72 in the embodiment shown in FIG. 7, and/or configured to support another process of the technology described in this specification.

For example, the transceiver 1302 is configured to send configuration information to a terminal device, where the configuration information is used to indicate the terminal device to perform frequency hopping within P subbands, and P is a positive integer.

The transceiver 1302 is further configured to receive an SRS from the terminal device in a frequency hopping manner within the P subbands, where the network device 1300 traverses all of the P subbands when receiving the SRS in P first time units, and the network device 1300 traverses all transmit antennas of the terminal device when receiving the SRS in the P first time units; and the processor 1301 determines, based on the following formula, an index of an antenna used to receive the SRS in the P first time units, where when the terminal device has two antennas and sends the SRS by using one of the antennas at a same moment, the index of the antenna used to send the SRS in the P first time units satisfies the following formula: $a(n_{SRS\_ant})=n_{SRS\_ant}$ mod 2, where $a(n_{SRS\_ant})$ represents the index of the antenna used to send the SRS, $n_{SRS\_ant}=\lfloor n'_{SRS}/M_a \rfloor$, and mod represents a modulo operation; or when the terminal device has four antennas and sends the SRS by using one of the antennas at a same moment, the index of the antenna used to send the SRS in the P first time units satisfies the following formula: $a(n_{SRS\_ant})=n_{SRS\_ant}$ mod 4, where $a(n_{SRS\_ant})$ represents the index of the antenna used to send the SRS, $n_{SRS\_ant}=\lfloor n'_{SRS}/M_a \rfloor$, and mod represents a modulo operation; or when the terminal device has four antennas and sends the SRS by using two of the antennas at a same moment, the index of the antenna used to send the SRS in the P first time units satisfies the following formula: $a(n_{SRS\_ant})=n_{SRS\_ant}$ mod $\Lambda$, where $a(n_{SRS\_ant})$ represents the index of the antenna used to send the SRS, $n_{SRS\_ant}=\lfloor n'_{SRS}/M_a \rfloor$, and mod represents a modulo operation, and $\Lambda$ is 2 or 3, where $M_a$ is a quantity of first time units that are consecutively used to send the SRS in one subframe by using a same antenna, and $n'_{SRS}$ is a first index of a first time unit used to send the SRS.

All related content of the steps in the foregoing method embodiments may be cited in function descriptions of the corresponding function modules. Details are not described herein again.

Figure 14A:
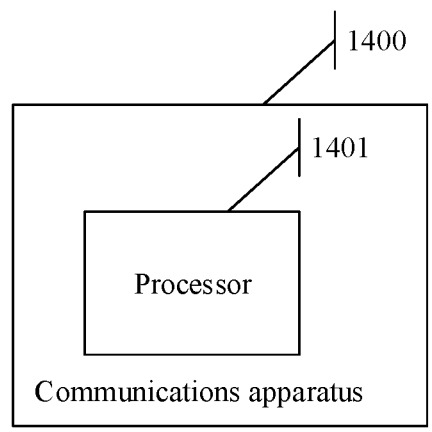
FIG. 14A and FIG. 14B are two schematic diagrams of a communications apparatus according to an embodiment of this application.

In a simple embodiment, a person skilled in the art may figure out that when the terminal device 1000, the network device 1100, the terminal device 1200, or the network device 1300 is a chip, the terminal device 1000, the network device 1100, the terminal device 1200, or the network device 1300 may be further implemented by using a structure of a communications apparatus 1400 shown in FIG. 14A. The communications apparatus 1400 may implement a function of the terminal device or the network device described above. The communications apparatus 1400 may include a processor 1401.

When the communications apparatus 1400 is configured to implement the function of the network device described above, the processor 1401 may be configured to: generate configuration information in the embodiment shown in FIG. 4, determine, based on $M_{SRS}$, a first index $n'_{SRS}$ of a first time unit used to send an SRS, and determine, based on $n'_{SRS}$ and $M_a$, an antenna that is used to send the SRS in a first time unit and that corresponds to $n'_{SRS}$. $M_a$ is a process such as a quantity of first time units that are consecutively used to send the SRS in one subframe by using a same antenna, and/or configured to support another process of the technology described in this specification. Alternatively, when the communications apparatus 1400 is configured to implement the function of the terminal device described above, the processor 1401 may be configured to perform S42 and S43 in the embodiment shown in FIG. 4, and/or configured to support another process of the technology described in this specification. Alternatively, when the communications apparatus 1400 is configured to implement the function of the network device described above, the processor 1401 may be configured to perform a process such as determining an antenna and a subband used to send an SRS in the embodiment shown in FIG. 7, and/or configured to support another process of the technology described in this specification. Alternatively, when the communications apparatus 1400 is configured to implement the function of the terminal device described above, the processor 1401 may be configured to perform a process such as determining an antenna and a subband used to send an SRS in the embodiment shown in FIG. 7, and/or configured to support another process of the technology described in this specification.

The communications apparatus 1400 may be implemented by using a field programmable gate array (FPGA), an application-specific integrated circuit (ASIC), a system on chip (SoC), a central processing unit (CPU), a network processor (NP), a digital signal processing circuit (DSP), a micro controller unit (MCU), a programmable logic device (PLD), or another integrated chip. The communications apparatus 1400 may be disposed in the network device or the terminal device in the embodiments of this application, so that the network device or the terminal device implements the method provided in the embodiments of this application.

In an optional implementation, the communications apparatus 1400 may include a transceiver component, configured to communicate with another device. When the communications apparatus 1400 is configured to implement the function of the network device or the terminal device described above, the transceiver component may be configured to perform S41 and S44 in the embodiment shown in FIG. 4, and/or configured to support another process of the technology described in this specification. Alternatively, when the communications apparatus 1400 is configured to implement the function of the network device or the terminal device described above, the transceiver component may be configured to perform S71 and S72 in the embodiment shown in FIG. 7, and/or configured to support another process of the technology described in this specification. For example, the transceiver component is a communications interface. If the communications apparatus 1400 is a network device or a terminal device, the communications interface may be a transceiver in the network device or the terminal device, for example, a transceiver 402 or a transceiver 502. The transceiver is, for example, a radio frequency transceiver component in the network device or the terminal device. Alternatively, if the communications apparatus 1400 is a chip disposed in a network device or a terminal device, the communications interface may be an input/output interface of the chip, for example, an input/output pin.

Figure 14B:
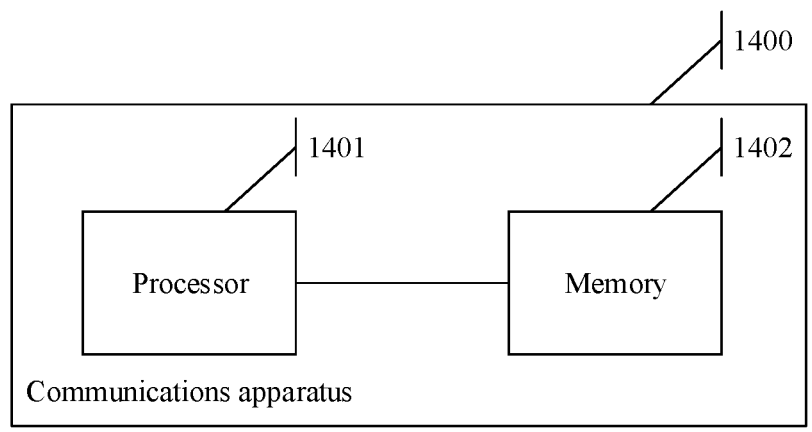

In an optional implementation, the communications apparatus 1400 may further include a memory 1402. Referring to FIG. 14B, the memory 1402 is configured to store computer programs or instructions, and the processor 1401 is configured to decode and execute the computer programs or the instructions. It should be understood that these computer programs or instructions may include function programs of the network device or the terminal device. When the function programs of the network device are decoded and executed by the processor 1401, the network device may be enabled to implement functions of the network device in the method provided in the embodiment shown in FIG. 4 or the embodiment shown in FIG. 7 in the embodiments of this application. When the function programs of the terminal device are decoded and executed by the processor 1401, the terminal device may be enabled to implement functions of the terminal device in the method provided in the embodiment shown in FIG. 4 or the embodiment shown in FIG. 7 in the embodiments of this application.

In another optional implementation, these function programs of the network device or the terminal device are stored in an external memory of the communications apparatus 1400. When the function programs of the network device are decoded and executed by the processor 1401, the memory 1402 temporarily stores some or all content of the function programs of the network device. When the function programs of the terminal device are decoded and executed by the processor 1401, the memory 1402 temporarily stores some or all content of the function programs of the terminal device.

In another optional implementation, these function programs of the network device or the terminal device are set to be stored in the memory 1402 in the communications apparatus 1400. When the memory 1402 in the communications apparatus 1400 stores the function programs of the network device, the communications apparatus 1400 may be disposed in the network device in the embodiments of this application. When the memory 1402 in the communications apparatus 1400 stores the function programs of the terminal device, the communications apparatus 1400 may be disposed in the terminal device in the embodiments of this application.

In still another optional implementation, some content of these function programs of the network device is stored in an external memory of the communications apparatus 1400, and the other content of these function programs of the network device is stored in the memory 1402 in the communications apparatus 1400. Alternatively, some content of these function programs of the terminal device is stored in an external memory of the communications apparatus 1400, and the other content of these function programs of the terminal device is stored in the memory 1402 in the communications apparatus 1400.

In the embodiments of this application, the terminal device 1000, the network device 1100, the terminal device 1200, the network device 1300, and the communications apparatus 1400 may be presented in a form in which function modules are obtained through division based on corresponding functions, or may be presented in a form in which function modules are obtained through division in an integrated manner. The "module" herein may be an ASIC, a processor and a memory that execute one or more software or firmware programs, an integrated logic circuit, and/or another component that can provide the foregoing functions.

In addition, the terminal device 1000 provided in the embodiment shown in FIG. 10 may alternatively be implemented in another form. For example, the communications apparatus includes a processing unit and a transceiver unit. For example, the processing unit may be implemented by using the processor 1001, and the transceiver unit may be implemented by using the transceiver 1002. The processing unit may be configured to perform S42 and S43 in the embodiment shown in FIG. 4, and/or configured to support another process of the technology described in this specification. The transceiver unit may be configured to perform S41 and S44 in the embodiment shown in FIG. 4, and/or configured to support another process of the technology described in this specification.

For example, the transceiver unit is configured to receive configuration information from a network device, where the configuration information is used to indicate a quantity $M_{SRS}$ of first time units that are used by the terminal device to send an SRS in one subframe, and the subframe includes a plurality of first time units.

The processing unit is configured to determine, based on $M_{SRS}$, a first index $n'_{SRS}$ of a first time unit used to send the SRS.

The processing unit is further configured to determine, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The transceiver unit is further configured to send, by using the antenna, the SRS in the first time unit indicated by $n'_{SRS}$.

All related content of the steps in the foregoing method embodiments may be cited in function descriptions of the corresponding function modules. Details are not described herein again.

The network device 1100 provided in the embodiment shown in FIG. 11 may alternatively be implemented in another form. For example, the communications apparatus includes a processing unit and a transceiver unit. For example, the processing unit may be implemented by using the processor 1101, and the transceiver unit may be implemented by using the transceiver 1102. The processing unit may be configured to: generate configuration information in the embodiment shown in FIG. 4, determine, based on $M_{SRS}$, a first index $n'_{SRS}$ of a first time unit used to send an SRS, and determine, based on $n'_{SRS}$ and $M_a$, an antenna that is used to send the SRS in a first time unit and that corresponds to $n'_{SRS}$. $M_a$ is a process such as a quantity of first time units that are consecutively used to send the SRS in one subframe by using a same antenna, and/or configured to support another process of the technology described in this specification. The transceiver unit may be configured to perform S41 and S44 in the embodiment shown in FIG. 4, and/or configured to support another process of the technology described in this specification.

For example, the transceiver unit is configured to send configuration information to a terminal device, where the configuration information is used to indicate a quantity $M_{SRS}$ of first time units that are used by the terminal device to send an SRS in one subframe, and the subframe includes a plurality of first time units.

The processing unit is configured to determine, based on $M_{SRS}$, a first index $n'_{SRS}$ of a first time unit used to send the SRS.

The processing unit is further configured to determine, based on $n'_{SRS}$ and $M_a$, an antenna that is used to send the SRS in a first time unit and that corresponds to $n'_{SRS}$, where $M_a$ is a quantity of first time units that are consecutively used to send the SRS in one subframe by using a same antenna.

The transceiver unit is further configured to receive, by using the antenna, the SRS in the first time unit indicated by $n'_{SRS}$.

All related content of the steps in the foregoing method embodiments may be cited in function descriptions of the corresponding function modules. Details are not described herein again.

The terminal device 1200 provided in the embodiment shown in FIG. 12 may alternatively be implemented in another form. For example, the communications apparatus includes a processing unit and a transceiver unit. For example, the processing unit may be implemented by using the processor 1201, and the transceiver unit may be implemented by using the transceiver 1202. The processing unit may be configured to perform a process such as determining an antenna and a subband used to send an SRS in the embodiment shown in FIG. 7, and/or configured to support another process of the technology described in this specification. The transceiver unit may be configured to perform S71 and S72 in the embodiment shown in FIG. 7, and/or configured to support another process of the technology described in this specification.

For example, the transceiver unit is configured to receive configuration information from a network device, where the configuration information is used to indicate the communications device to perform frequency hopping within P subbands, and P is a positive integer.

The transceiver unit is further configured to send an SRS to the network device in a frequency hopping manner within the P subbands, where the terminal device traverses all of the P subbands when sending the SRS in P first time units, and the communications device traverses all transmit antennas of the communications device when sending the SRS in the P first time units; and the processing unit determines, based on the following formula, an index of an antenna used to send the SRS in the P first time units, where when the communications device has two antennas and sends the SRS by using one of the antennas at a same moment, the index of the antenna used to send the SRS in the P first time units satisfies the following formula: $a(n_{SRS\_ant})=n_{SRS\_ant} \bmod 2$, where $a(n_{SRS\_ant})$ represents the index of the antenna used to send the SRS, $n_{SRS\_ant}=\lfloor n'_{SRS}/M_a \rfloor$, and mod represents a modulo operation; or when the communications device has four antennas and sends the SRS by using one of the antennas at a same moment, the index of the antenna used to send the SRS in the P first time units satisfies the following formula: $a(n_{SRS\_ant})=n_{SRS\_ant} \bmod 4$, where $a(n_{SRS\_ant})$ represents the index of the antenna used to send the SRS, $n_{SRS\_ant}=\lfloor n'_{SRS}/M_a \rfloor$, and mod represents a modulo operation; or when the communications device has four antennas and sends the SRS by using two of the antennas at a same moment, the index of the antenna used to send the SRS in the P first time units satisfies the following formula: $a(n_{SRS\_ant})=n_{SRS\_ant} \bmod \Lambda$, where $a(n_{SRS\_ant})$ represents the index of the antenna used to send the SRS, $n_{SRS\_ant}=\lfloor n'_{SRS}/M_a \rfloor$, and mod represents a modulo operation, and $\Lambda$ is 2 or 3, where $M_a$ is a quantity of first time units that are consecutively used to send the SRS in one subframe by using a same antenna, and $n'_{SRS}$ is a first index of a first time unit used to send the SRS.

All related content of the steps in the foregoing method embodiments may be cited in function descriptions of the corresponding function modules. Details are not described herein again.

The network device 1300 provided in the embodiment shown in FIG. 13 may alternatively be implemented in another form. For example, the communications apparatus includes a processing unit and a transceiver unit. For example, the processing unit may be implemented by using the processor 1301, and the transceiver unit may be implemented by using the transceiver 1302. The processing unit may be configured to perform a process such as determining an antenna and a subband used to send an SRS in the embodiment shown in FIG. 7, and/or configured to support another process of the technology described in this specification. The transceiver unit may be configured to perform S71 and S72 in the embodiment shown in FIG. 7, and/or configured to support another process of the technology described in this specification.

For example, the transceiver unit is configured to send configuration information to a terminal device, where the configuration information is used to indicate the terminal device to perform frequency hopping within P subbands, and P is a positive integer.

The transceiver unit is further configured to receive an SRS from the terminal device in a frequency hopping manner within the P subbands, where the communications device traverses all of the P subbands when receiving the SRS in P first time units, and the communications device traverses all transmit antennas of the terminal device when receiving the SRS in the P first time units; and the processing unit determines, based on the following formula, an index of an antenna used to receive the SRS in the P first time units, where when the terminal device has two antennas and sends the SRS by using one of the antennas at a same moment, the index of the antenna used to send the SRS in the P first time units satisfies the following formula: $a(n_{SRS\_ant})=n_{SRS\_ant}$ mod 2, where $a(n_{SRS\_ant})$ represents the index of the antenna used to send the SRS, $n_{SRS\_ant}=\lfloor n'_{SRS}/M_a \rfloor$, and mod represents a modulo operation; or when the terminal device has four antennas and sends the SRS by using one of the antennas at a same moment, the index of the antenna used to send the SRS in the P first time units satisfies the following formula: $a(n_{SRS\_ant})=n_{SRS\_ant}$ mod 4, where $a(n_{SRS\_ant})$ represents the index of the antenna used to send the SRS, $n_{SRS\_ant}=\lfloor n'_{SRS}/M_a \rfloor$, and mod represents a modulo operation; or when the terminal device has four antennas and sends the SRS by using two of the antennas at a same moment, the index of the antenna used to send the SRS in the P first time units satisfies the following formula: $a(n_{SRS\_ant})=n_{SRS\_ant}$ mod $\Lambda$, where $a(n_{SRS\_ant})$ represents the index of the antenna used to send the SRS, $n_{SRS\_ant}=\lfloor n'_{SRS}/M_a \rfloor$, and mod represents a modulo operation, and $\Lambda$ is 2 or 3, where $M_a$ is a quantity of first time units that are consecutively used to send the SRS in one subframe by using a same antenna, and $n'_{SRS}$ is a first index of a first time unit used to send the SRS.

All related content of the steps in the foregoing method embodiments may be cited in function descriptions of the corresponding function modules. Details are not described herein again.

The terminal device 1000, the network device 1100, the terminal device 1200, the network device 1300, and the communications apparatus 1400 provided in the embodiments of this application may be configured to perform the method provided in the embodiment shown in FIG. 4 or the embodiment shown in FIG. 7. Therefore, for technical effects that can be achieved by the terminal device 1000, the network device 1100, the terminal device 1200, the network device 1300, and the communications apparatus 1400, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to the embodiments of this application without departing from the spirit and scope of this application. In this way, this application is intended to cover these modifications and variations of the embodiments of this application provided that they fall within the scope of the claims of this application and their equivalent technologies.

What is claimed is:

1. A sounding reference signal (SRS) sending method, comprising:
   receiving, by a terminal device, configuration information from a network device, wherein the configuration information indicates to the terminal device that frequency hopping is performed within P subbands, and P is a positive integer:
   sending, by the terminal device, an SRS to the network device in a frequency hopping manner within the P subbands, wherein the terminal device traverses the P subbands and a plurality of transmit antennas of the terminal device while sending the SRS in P first time units; and
   determining, by the terminal device, an index of a transmit antenna for sending the SRS in the P first time units based on a formula comprising $a(n_{SRS\_ant})=n_{SRS\_ant}$ mod $\Lambda$, wherein $a(n_{SRS\_ant})$ represents the index of the transmit antenna sending the SRS, $n_{SRS\_ant}$ is equal to $\lfloor n'_{SRS}/M_a \rfloor$, $M_a$ is a quantity of first time units that are consecutively used for sending the SRS in one subframe by a particular transmit antenna, $n'_{SRS}$ is a first index of a first time unit for sending the SRS, mod represents a modulo operation, and $\Lambda$ is a parameter that is dependent on a number of antennas included in the terminal device, wherein n'$_{SRS}$ satisfies the following formula:

$$n'_{SRS} = \left\{ \begin{array}{l} \left( 2N_{SP}n_f + 2(N_{SP}-1)\left\lfloor \frac{n_s}{10} \right\rfloor + \left\lfloor \frac{T_{offset}}{T_{offset\_max}} \right\rfloor \right) \times M_{SRS} + m, \text{ case (1)} \\ \left\lfloor n_f \times 10 + \left\lfloor \frac{n_s}{2} \right\rfloor \right\rfloor / T_{SRS} \right\rfloor \times M_{SRS} + m, \text{ other cases} \end{array} \right\},$$

wherein T$_{SRS}$ represents an SRS transmission periodicity configured by the network device for the terminal device, T$_{offset}$ represents a position of a subframe that is for sending the SRS in the SRS transmission periodicity T$_{SRS}$ configured by the network device for the terminal device, N$_{SP}$ represents a quantity of downlink-to-uplink switching points in a radio frame in which the SRS is located, n$_f$ represents a frame number of a radio frame in which the SRS is located, n$_s$ represents a slot number in the radio frame in which the SRS is located, n$_s$=0, 1, ..., 19, M$_{SRS}$ represents a quantity of first time units that are allocated to the terminal device to transmit the SRS in one subframe, m represents an index of a first time unit that is allocated to the terminal device to transmit the SRS in one subframe, and m=0, 1, ..., M$_{SRS}$−1, and wherein case (1) corresponds with a frame structure type 2 with an SRS transmission periodicity of 2 ms.

2. The method according to claim 1, wherein, responsive to determining that the terminal device has two transmit antennas and sends the SRS by using one of the two transmit antennas at a same moment, Λ is equal to 2.

3. The method according to claim 1, wherein, responsive to determining that the terminal device has four transmit antennas and sends the SRS by using one of the four transmit antennas at a same moment, Λ is equal to 4.

4. The method according to claim 1, wherein, responsive to determining that the terminal device has four transmit antennas and sends the SRS by using two of the four transmit antennas at a same moment, Λ is equal to 2 or 3.

5. The method according to claim 1, wherein the first time unit is one symbol.

6. The method according to claim 1, wherein the first time unit is H consecutive symbols, and H is an integer greater than or equal to 2.

7. A sounding reference signal (SRS) receiving method, comprising:
sending, by a network device, configuration information to a terminal device, wherein the configuration information indicates to the terminal device that frequency hopping is performed within P subbands, and P is a positive integer;
receiving, by the network device, an SRS to the network device in a frequency hopping manner within the P subbands, wherein the terminal device traverses the P subbands and a plurality of transmit antennas of the terminal device while sending the SRS in P first time units; and
determining, by the terminal device, an index of a transmit antenna for sending the SRS in the P first time units based on a formula comprising a(n$_{SRS\_ant}$)=n$_{SRS\_ant}$ mod Λ, wherein a(n$_{SRS\_ant}$) represents the index of the transmit antenna sending the SRS, n$_{SRS\_ant}$ is equal to ⌊n'$_{SRS}$/M$_a$⌋, M$_a$ is a quantity of first time units that are consecutively used for sending the SRS in one subframe by a particular transmit antenna, n'$_{SRS}$ is a first index of a first time unit for sending the SRS, mod represents a modulo operation, and Λ is a parameter that is dependent on a number of antennas included in the terminal device, wherein n'$_{SRS}$ satisfies the following formula:

$$n'_{SRS} = \left\{ \begin{array}{l} \left( 2N_{SP}n_f + 2(N_{SP}-1)\left\lfloor \frac{n_s}{10} \right\rfloor + \left\lfloor \frac{T_{offset}}{T_{offset\_max}} \right\rfloor \right) \times M_{SRS} + m, \text{ case (1)} \\ \left\lfloor n_f \times 10 + \left\lfloor \frac{n_s}{2} \right\rfloor \right\rfloor / T_{SRS} \right\rfloor \times M_{SRS} + m, \text{ other cases} \end{array} \right\},$$

wherein T$_{SRS}$ represents an SRS transmission periodicity configured by the network device for the terminal device, T$_{offset}$ represents a position of a subframe that is for sending the SRS in the SRS transmission periodicity T$_{SRS}$ configured by the network device for the terminal device, N$_{SP}$ represents a quantity of downlink-to-uplink switching points in a radio frame in which the SRS is located, n$_f$ represents a frame number of a radio frame in which the SRS is located, n$_s$ represents a slot number in the radio frame in which the SRS is located, n$_s$=0, 1, ..., 19, M$_{SRS}$ represents a quantity of first time units that are allocated to the terminal device to transmit the SRS in one subframe, m represents an index of a first time unit that is allocated to the terminal device to transmit the SRS in one subframe, and m=0, 1, ..., M$_{SRS}$−1, and wherein case (1) corresponds with a frame structure type 2 with an SRS transmission periodicity of 2 ms.

8. The method according to claim 7, wherein, responsive to determining that the terminal device has two transmit antennas and sends the SRS by using one of the two transmit antennas at a same moment, Λ is equal to 2.

9. The method according to claim 7, wherein, responsive to determining that the terminal device has four transmit antennas and sends the SRS by using one of the four transmit antennas at a same moment, Λ is equal to 4.

10. The method according to claim 7, wherein, responsive to determining that the terminal device has four transmit antennas and sends the SRS by using two of the four transmit antennas at a same moment, Λ is equal to 2 or 3.

11. The method according to claim 7, wherein the first time unit corresponds with one symbol.

12. The method according to claim 7, wherein the first time unit corresponds with H consecutive symbols, and H is an integer greater than or equal to 2.

13. A terminal device, comprising:
a transceiver, configured to receive configuration information from a network device, wherein the configuration information indicates to the terminal device that frequency hopping is performed within P subbands, and P is a positive integer, wherein the transceiver is further configured to send a sounding reference signal (SRS) to the network device in a frequency hopping manner within the P subbands, wherein the terminal device traverses the P subbands and a plurality of transmit antennas of the terminal device while sending the SRS in P first time units; and
a processor configured to determine an index of a transmit antenna for sending the SRS in the P first time units, based on a formula comprising a(n$_{SRS\_ant}$)=n$_{SRS\_ant}$ mod Λ, wherein a(n$_{SRS\_ant}$) represents the index of the transmit antenna sending the SRS, n$_{SRS\_ant}$ is equal to ⌊n'$_{SRS}$/M$_a$⌋, M$_a$ is a quantity of first time units that are consecutively used for sending the SRS in one subframe by a particular transmit antenna, n'$_{SRS}$ is a first index of a first time unit for sending the SRS, mod represents a modulo operation, and $\Lambda$ is a parameter that is dependent on a number of antennas included in the terminal device, wherein $n'_{SRS}$ satisfies the following formula:

$$n'_{SRS} = \begin{cases} \left(2N_{SP}n_f + 2(N_{SP}-1)\left\lfloor\frac{n_s}{10}\right\rfloor + \left\lfloor\frac{T_{offset}}{T_{offset\_max}}\right\rfloor\right) \times M_{SRS} + m, \text{ case (1)} \\ \left\lfloor n_f \times 10 + \left\lfloor\frac{n_s}{2}\right\rfloor\right\rfloor / T_{SRS}\rfloor \times M_{SRS} + m, \text{ other cases} \end{cases},$$

wherein $T_{SRS}$ represents an SRS transmission periodicity configured by the network device for the terminal device, $T_{offset}$ represents a position of a subframe that is for sending the SRS in the SRS transmission periodicity $T_{SRS}$ configured by the network device for the terminal device, $N_{SP}$ represents a quantity of downlink-to-uplink switching points in a radio frame in which the SRS is located, $n_f$ represents a frame number of a radio frame in which the SRS is located, $n_s$ represents a slot number in the radio frame in which the SRS is located, $n_s=0, 1, \ldots, 19$, $M_{SRS}$ represents a quantity of first time units that are allocated to the terminal device to transmit the SRS in one subframe, m represents an index of a first time unit that is allocated to the terminal device to transmit the SRS in one subframe, and m=0, 1, ..., $M_{SRS}-1$, and wherein case (1) corresponds with a frame structure type 2 with an SRS transmission periodicity of 2 ms.

14. The terminal device according to claim 13, wherein, responsive to determining that the terminal device has two transmit antennas and sends the SRS by using one of the two transmit antennas at a same moment, $\Lambda$ is equal to 2.

15. The terminal device according to claim 13, wherein, responsive to determining that the terminal device has four transmit antennas and sends the SRS by using one of the four transmit antennas at a same moment, $\Lambda$ is equal to 4.

16. The terminal device according to claim 13, wherein, responsive to determining that the terminal device has four transmit antennas and sends the SRS by using two of the four transmit antennas at a same moment, $\Lambda$ is equal to 2 or 3.

17. The terminal device according to claim 13, wherein the first time unit is H consecutive symbols, and H is an integer greater than or equal to 2.

* * * * *

UNITED STATES PATENT AND TRADEMARK OFFICE
CERTIFICATE OF CORRECTION

PATENT NO. : 12,149,383 B2
APPLICATION NO. : 17/340975
DATED : November 19, 2024
INVENTOR(S) : Ruiqi Zhang Page 1 of 1

It is certified that error appears in the above-identified patent and that said Letters Patent is hereby corrected as shown below:

In the Claims

Claim 1: Column 58, Line 49: "positive integer:" should read as -- positive integer; --.

Claim 7: Column 59, Line 52: "positive integer:" should read as -- positive integer; --.

Signed and Sealed this
Third Day of June, 2025

Coke Morgan Stewart
*Acting Director of the United States Patent and Trademark Office*